United States Patent
Nakamae

(10) Patent No.: US 11,042,705 B2
(45) Date of Patent: Jun. 22, 2021

(54) ELECTRONIC DEVICE, RECOGNITION METHOD, AND NON-TRANSITORY COMPUTER-READABLE STORAGE MEDIUM

(71) Applicant: Dynabook Inc., Tokyo (JP)

(72) Inventor: Midori Nakamae, Hino Tokyo (JP)

(73) Assignee: Dynabook Inc., Tokyo (JP)

(*) Notice: Subject to any disclaimer, the term of this patent is extended or adjusted under 35 U.S.C. 154(b) by 202 days.

(21) Appl. No.: 16/427,893

(22) Filed: May 31, 2019

(65) Prior Publication Data

US 2020/0097542 A1 Mar. 26, 2020

(30) Foreign Application Priority Data

Sep. 20, 2018 (JP) .............................. JP2018-175636

(51) Int. Cl.
*G10L 15/00* (2013.01)
*G06F 40/289* (2020.01)
*G06F 3/16* (2006.01)
*G10L 15/08* (2006.01)
*G06F 40/205* (2020.01)

(52) U.S. Cl.
CPC ............ *G06F 40/289* (2020.01); *G06F 3/167* (2013.01); *G06F 40/205* (2020.01); *G10L 15/08* (2013.01); *G10L 2015/088* (2013.01)

(58) Field of Classification Search
CPC ...... G06F 40/289; G06F 40/205; G06F 3/167; G10L 15/08; G10L 2015/088; G10L 2015/223; G10L 15/28; G10L 15/22; G10L 15/183

USPC ............... 704/231, 236, 251, 275, E15.001; 709/223; 707/E17.005, E17.085; 717/168
See application file for complete search history.

(56) References Cited

U.S. PATENT DOCUMENTS

| | | | |
|---|---|---|---|
| 8,700,392 B1* | 4/2014 | Hart | G10L 15/25 704/231 |
| 2004/0148381 A1* | 7/2004 | Beppu | G06F 40/242 709/223 |
| 2010/0036665 A1* | 2/2010 | Bess | G06F 8/38 704/251 |
| 2017/0279933 A1* | 9/2017 | Schurman | H03M 7/3084 |
| 2019/0130926 A1* | 5/2019 | Giri | H04R 1/1083 |

FOREIGN PATENT DOCUMENTS

| | | |
|---|---|---|
| JP | 04-302025 A | 10/1992 |
| JP | 2003-280683 A | 10/2003 |
| JP | 2010-191223 A | 9/2010 |
| JP | 2013-068665 A | 4/2013 |

* cited by examiner

*Primary Examiner* — Charlotte M Baker
(74) *Attorney, Agent, or Firm* — Knobbe, Martens, Olson & Bear, LLP

(57) ABSTRACT

According to one embodiment, an electronic device comprises a memory that stores dictionary data, a voice input receiver, and a hardware processor. The dictionary data comprises first dictionary data and updatable second dictionary data. A number of voice commands in the first dictionary data is greater than a number of voice commands in the second dictionary data. The first dictionary data is divided into sub-dictionaries. The hardware processor recognizes the received voice using at least one of the sub-dictionaries or the second dictionary data.

14 Claims, 18 Drawing Sheets

414

| Dictionary memory 422a | | | 424a | |
|---|---|---|---|---|
| First dictionary data | | | Second dictionary data | |
| Tag | Voice command | Key code (function) | Voice command | Key code (function) |
| Camera | Suchiru | Enter (Take still image) | Sakura ichi | s,a,k,u,r,a,1 (Select picture /video of name "sakura1") |
| | Zumu in | Up (Increase magnification) | Sakura ni | s,a,k,u,r,a,2 (Select picture /video of name "sakura2") |
| | Zumu auto | Down (Decrease magnification) | Sakura san | s,a,k,u,r,a,3 (Select picture /video of name "sakura3") |
| | Bideo on | Ctrl+s (Start taking video) | Ume | u,m,e (Select picture /video of name "ume") |
| | Bideo ofu | Ctrl+e (End taking video) | Derito | Delete (Delete selected picture/video) |
| Viewer | Zumu in | Up (Enlarge display) | | |
| | Zumu auto | Down (Undo enlarged display) | | |
| | Tsugi | Next (Display next picture/video) | | |
| | Mae | Previ (Display previous picture/video) | | |
| ⋮ | ⋮ | ⋮ | | |

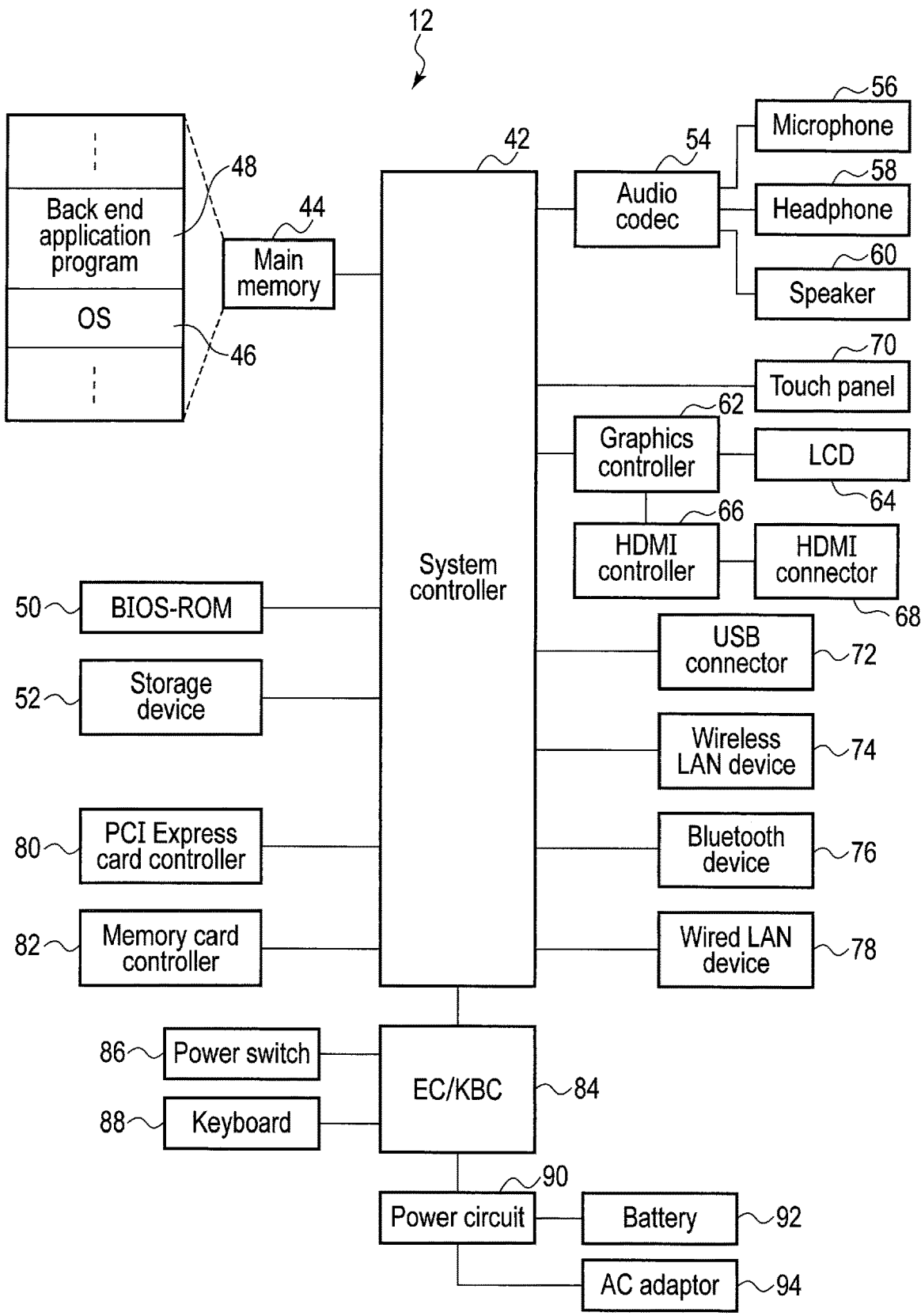
F I G. 2

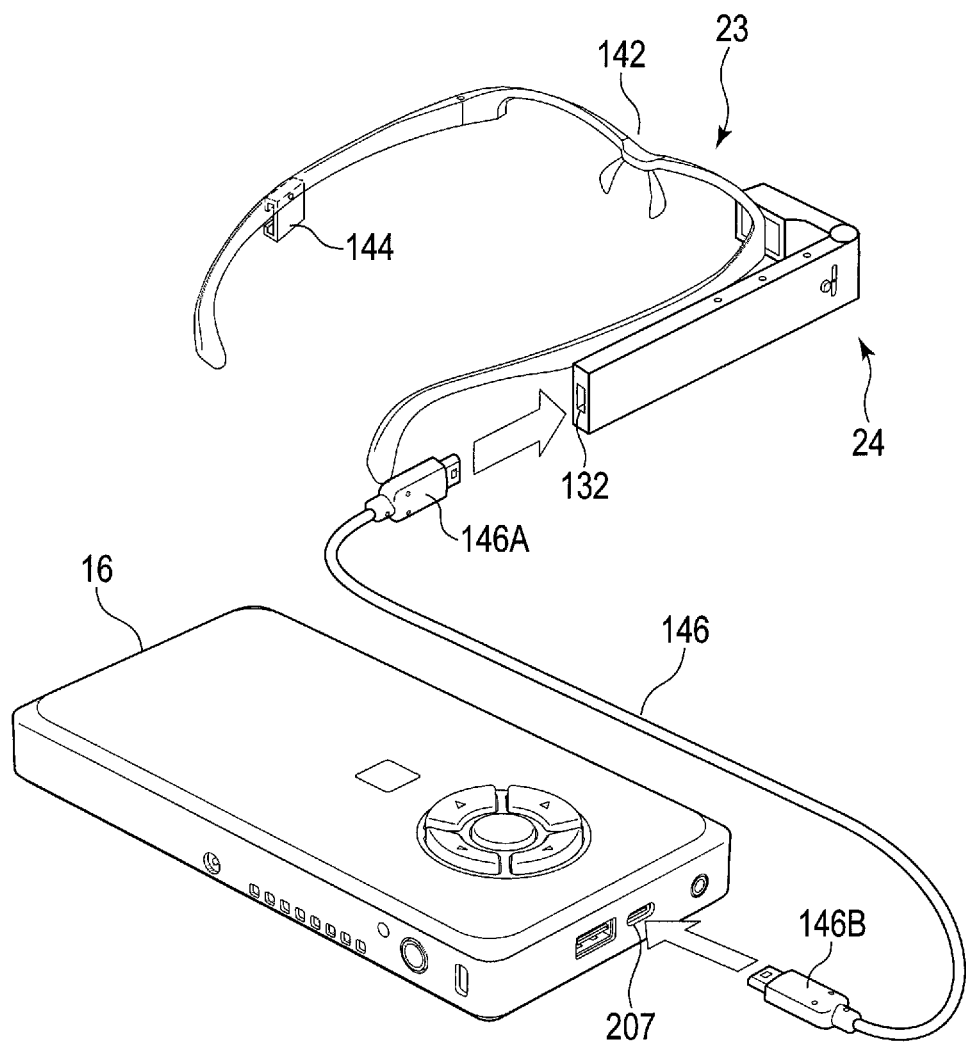
F I G. 5

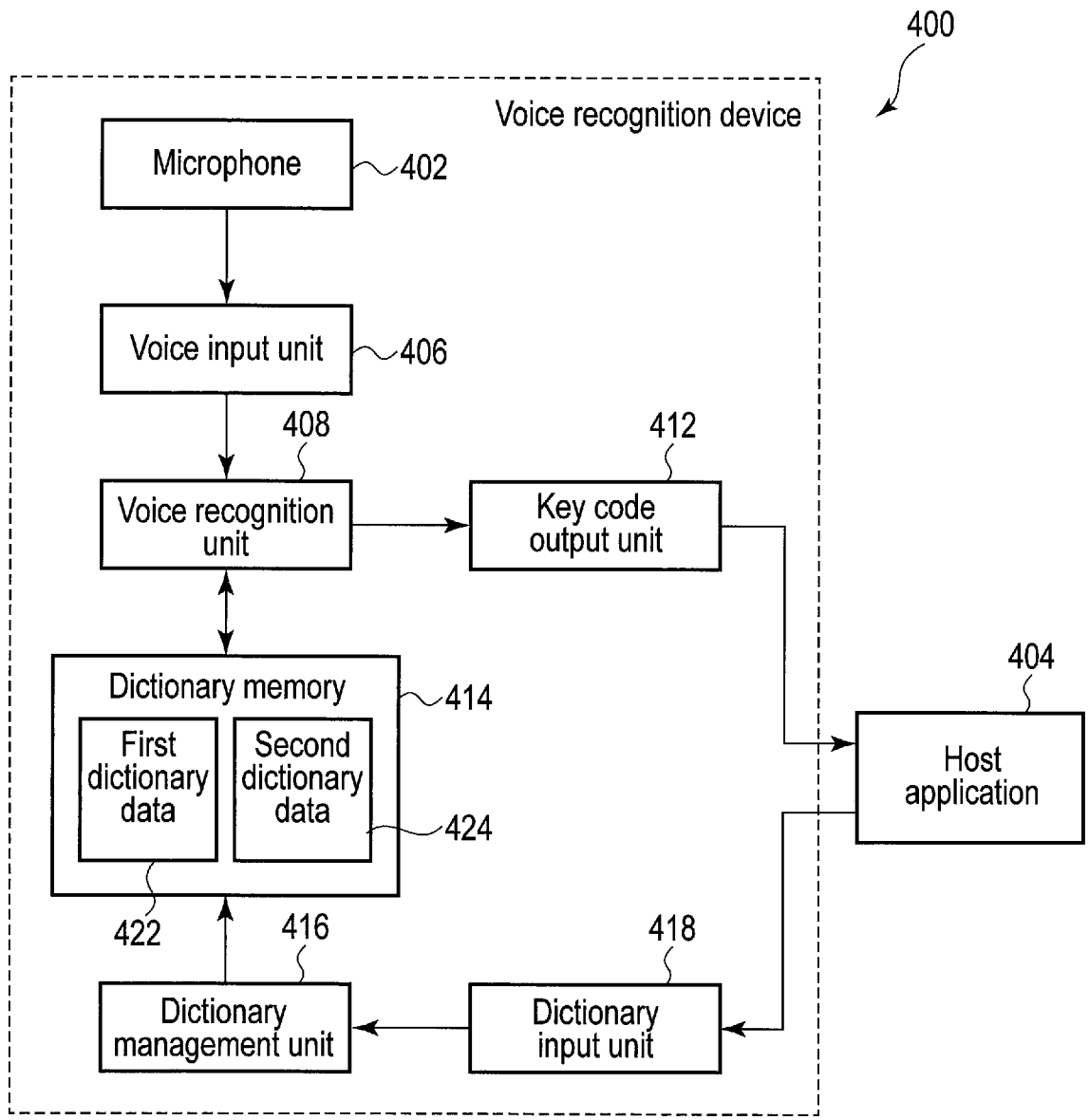
F I G. 9

Dictionary memory 414

First dictionary data 422a

| Tag | Voice command | Key code (function) |
|---|---|---|
| Camera | Suchiru | Enter (Take still image) |
| | Zumu in | Up (Increase magnification) |
| | Zumu auto | Down (Decrease magnification) |
| | Bideo on | Ctrl+s (Start taking video) |
| | Bideo ofu | Ctrl+e (End taking video) |
| Viewer | Zumu in | Up (Enlarge display) |
| | Zumu auto | Down (Undo enlarged display) |
| | Tsugi | Next (Display next picture/video) |
| | Mae | Previ (Display previous picture/video) |
| ... | ... | ... |

Second dictionary data 424a

| Voice command | Key code (function) |
|---|---|
| Sakura ichi | s,a,k,u,r,a,1 (Select picture /video of name "sakura1") |
| Sakura ni | s,a,k,u,r,a,2 (Select picture /video of name "sakura2") |
| Sakura san | s,a,k,u,r,a,3 (Select picture /video of name "sakura3") |
| Ume | u,m,e (Select picture /video of name "ume") |
| Derito | Delete (Delete selected picture/video) |

FIG. 10

Dictionary memory 414

First dictionary data 422a

| Tag | Voice command | Key code (function) |
|---|---|---|
| Camera | Suchiru | Enter (Take still image) |
| | Zumu in | Up (Increase magnification) |
| | Zumu auto | Down (Decrease magnification) |
| | Bideo on | Ctrl+s (Start taking video) |
| | Bideo ofu | Ctrl+e (End taking video) |
| Viewer | Zumu in | Up (Enlarge display) |
| | Zumu auto | Down (Undo enlarged display) |
| | Tsugi | Next (Display next picture/video) |
| | Mae | Previ (Display previous picture/video) |
| ... | ... | ... |

Second dictionary data 424b

| Voice command | Key code (function) |
|---|---|
| Sato | s,a,t,o (Select address "sato") |
| Suzuki | s,u,z,u,k,i (Select address "suzuki") |
| Tanaka | t,a,n,a,k,a (Select address "tanaka") |
| Watanabe | w,a,t,a,n,a,b,e (Select address "watanabe") |
| Tsuwa | Ctrl+1 (Call in selected address) |

F I G. 11

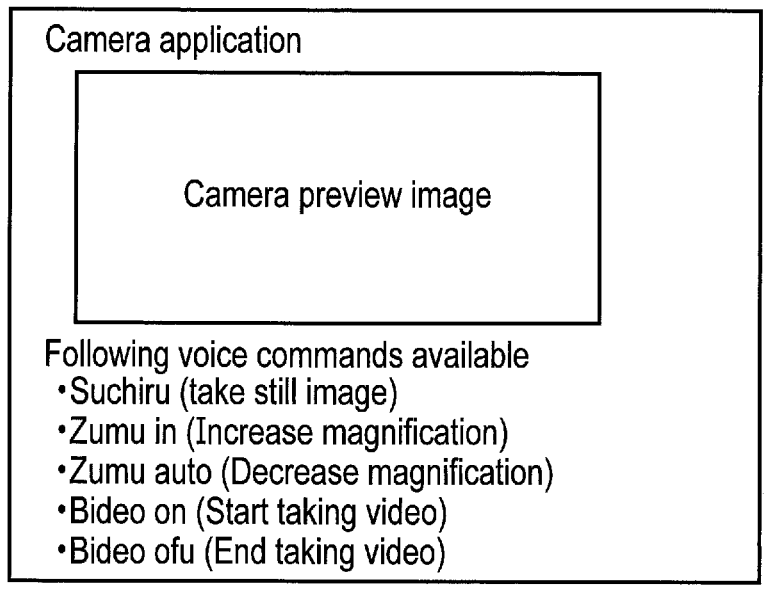
F I G. 14
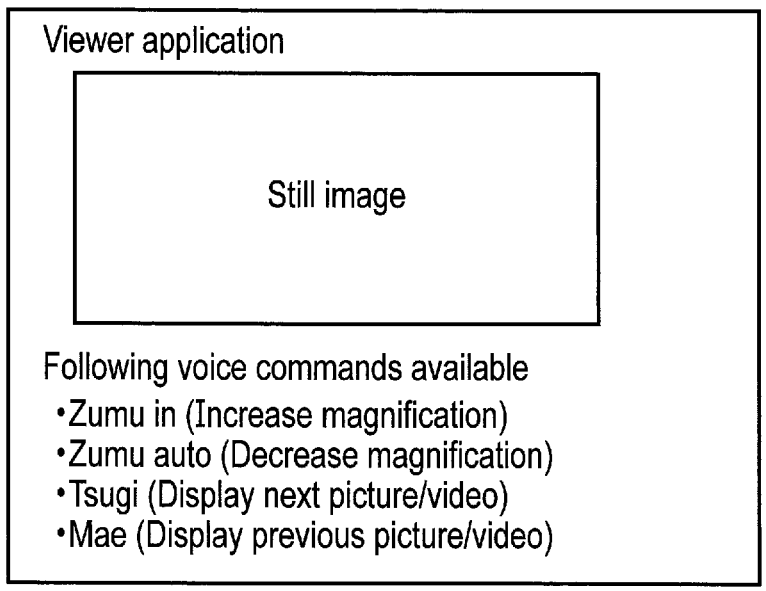
F I G. 15

File management application

Picture/video of following title can be deleted
Select file to delete via voice command Title
 • Sakura ichi
 • Sakura ni
 • Sakura san
 • Ume Operation
 • Derito (Delete selected picture/video)

F I G. 16

Communication application

Call to following address
Select address to call in via voice command

Address
 • Sato
 • Suzuki
 • Tanaka
 • Watanabe

Operation
 • Tuwa (Call in address selected)

F I G. 17

| First dictionary data | | |
|---|---|---|
| Tag | Voice command | Key code (function) |
| Single | Hai | F1 (Start voice recognition in single mode) |
| | Maruchi | F2 (Start voice recognition in multiple mode) |
| | Suchiru | Enter (Take still image) |
| | Zumu in | Up (Increase magnification) |
| | Zumu auto | Down (Decrease magnification) |
| | ⋮ | ⋮ |
| Multiple | Owari | F10 (End voice recognition in multiple mode) |
| | Suchiru | Enter (Take still image) |
| | Zumu in | Up (Increase magnification) |
| | Zumu auto | Down (Decrease magnification) |
| | ⋮ | ⋮ |

F I G. 18

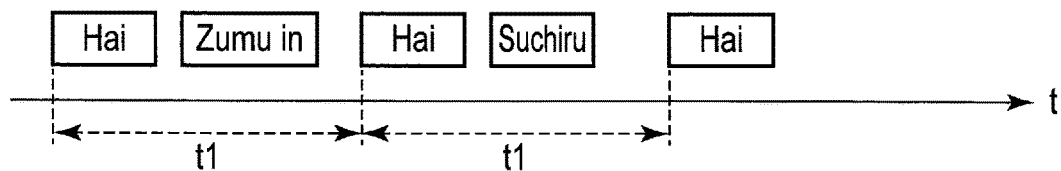

F I G. 19A

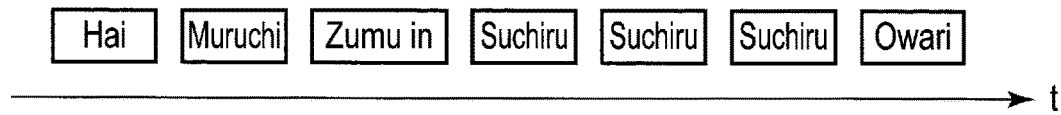

F I G. 19B

| First dictionary data ||| 422c |
| --- | --- | --- |
| Tag | Voice command | Key code (function) |
| Single | Hai | F1 (Start voice recognition in single mode) |
| | Haixtsu | F1 (Start voice recognition in single mode) |
| | Haii | F1 (Start voice recognition in single mode) |
| | | |
| | Suchiru | Enter (Take still image) |
| | Suchiiru | Enter (Take still image) |
| | | |
| | Zumu in | Up (Increase magnification) |
| | Zumu iin | Up (Increase magnification) |
| | Zuumu in | Up (Increase magnification) |
| | | |

FIG. 20

| Second dictionary data | 424c |
| --- | --- |
| Voice command | Key code (function) |
| | |
| Sato | s,a,t,o (Select address Sato) |
| Satoo | s,a,t,o (Select address Sato) |
| Satou | s,a,t,o (Select address Sato) |
| | |

FIG. 21

| First dictionary data or second dictionary data ||
|---|---|
| Voice command | Key code (function) |
| Appu | Up (Move cursor upward) |
| Ue | Up (Move cursor upward) |
| Appuu | Up, Up, Up, ⋯ (Move cursor upward continuously) |
| Uee | Up, Up, Up, ⋯ (Move cursor upward continuously) |
| Daun | Down (Move cursor downward) |
| Shita | Down (Move cursor downward) |
| Daunn | Down, Down, Down, ⋯ (Move cursor downward continuously) |
| Shitaa | Down, Down, Down, ⋯ (Move cursor downward continuously) |
| Raito | Right (Move cursor rightward) |
| Migi | Right (Move cursor rightward) |
| Raitoo | Right, Right, Right, ⋯ (Move cursor rightward continuously) |
| Migii | Right, Right, Right, ⋯ (Move cursor rightward continuously) |
| Refuto | Left (Move cursor leftward) |
| Hidari | Left (Move cursor leftward) |
| Refutoo | Left, Left, Left, ⋯ (Move cursor leftward continuously) |
| Hidarii | Left, Left, Left, ⋯ (Move cursor leftward continuously) |
| ⋮ | ⋮ |

F I G. 22

ELECTRONIC DEVICE, RECOGNITION METHOD, AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2018-175636, filed Sep. 20, 2018, the entire contents of which are incorporated herein by reference.

FIELD

Embodiments described herein relate generally to an electronic device, a recognition method, and a non-transitory computer-readable storage medium.

BACKGROUND

Electronic devices which can be operated by voice using a voice recognition technique to receive various commands to the electronic device as voice commands are developed. In such a device, a voice recognition device is added to the electronic device. The voice recognition device recognizes the voice input therein, converts a result of recognition into command data, and transmits the command data to the electronic device.

When a voice recognition device operates offline, dictionary data related to commands which may be used by an electronic device must be written in a memory of the voice recognition device, in advance. Thus, the size of dictionary data increases, and a time required for the recognition becomes longer, or a possibility of misrecognition becomes high.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing an exemplary structure of an operator terminal 12 in FIG. 1.

FIG. 5 is a view showing an example of connection between the mobile PC 16 and the wearable device main body 24.

FIG. 9 is a block diagram of an example of the function of the voice recognition device 400.

FIG. 10 shows examples of the first dictionary data 422a and the second dictionary data 424a.

FIG. 11 shows other examples of the first dictionary data 422a and the second dictionary data 424b.

FIG. 14 show an example of a screen displayer in the display device 124 where a tag "camera" is designated.

FIG. 15 show an example of a screen displayed in the display device 124 where a tag "viewer" is designated.

FIG. 16 shows the voice commands included in the second dictionary data 424a when a user starts using the file management application.

FIG. 17 shows the voice commands included in the second dictionary data 424b when a user starts using the communication application.

FIG. 18 shows a variation 422b of the first dictionary.

FIG. 19A shows an example of the voice recognition in the single mode.

FIG. 19B shows an example of the voice recognition in the multiple mode.

FIG. 20 shows another variation 422c of the first dictionary.

FIG. 21 shows another variation 424c of the second dictionary.

FIG. 22 shows another variation of the first dictionary or the second dictionary.

DETAILED DESCRIPTION

Figure 1:
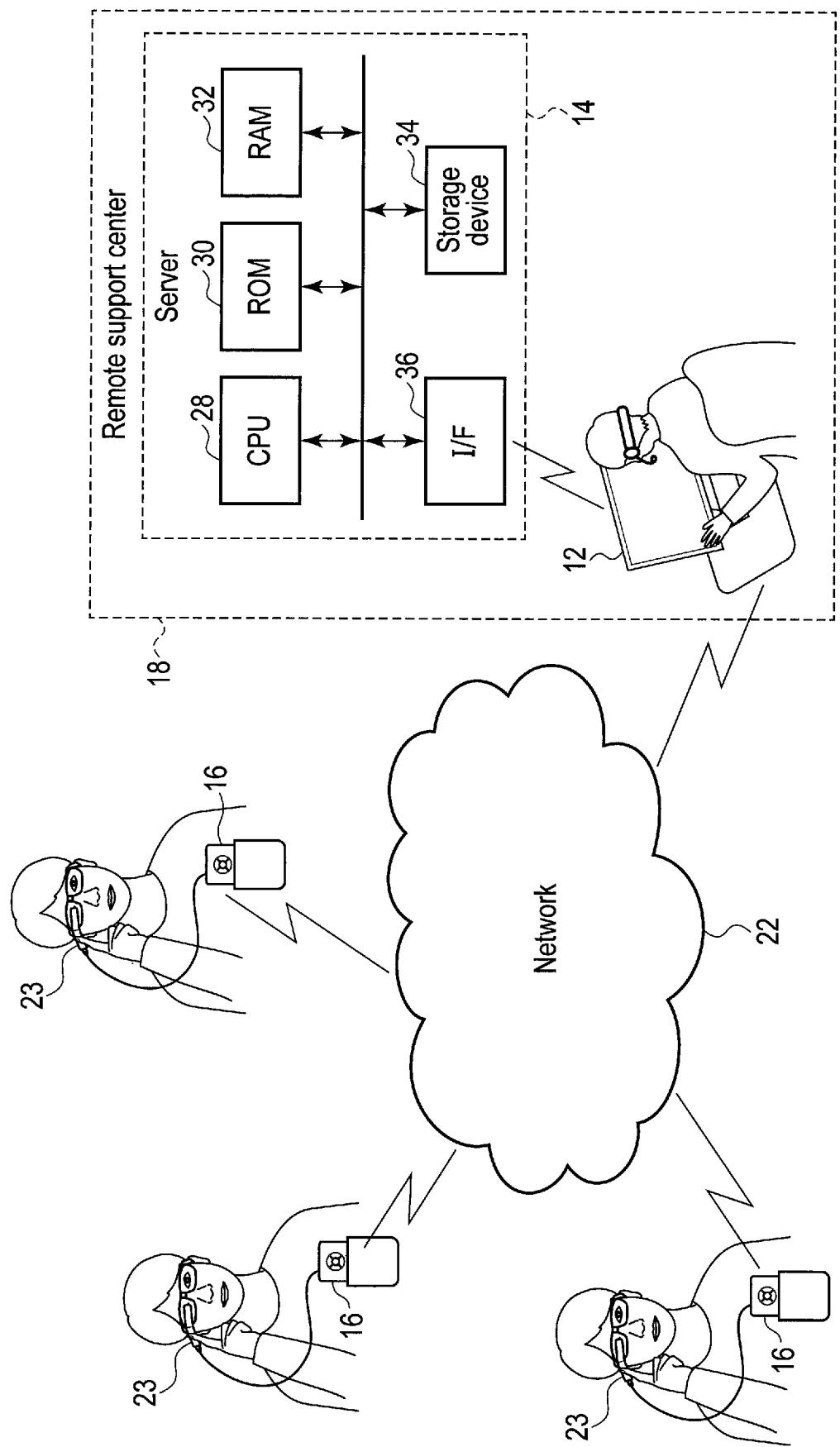
FIG. 1 is a block diagram showing an example of a remote support system including an electronic device according to an embodiment.

Various embodiments will be described hereinafter with reference to the accompanying drawings.

The disclosure is merely an example of an apparatus or a method for a technical idea of embodiments and is not limited by a structure, a form, an arrangement, or a material of respective parts described in the embodiments. Modification which is easily conceivable by a person of ordinary skill the art comes within the scope of the disclosure as a matter of course. In order to make the description clearer, the sizes, shapes and the like of the respective parts may be changed and illustrated schematically in the drawings as compared with those in an accurate representation. In several drawings, corresponding parts may be illustrated in a different size or shape. Constituent elements corresponding to each other in a plurality of drawings are denoted by like reference numerals and their detailed descriptions may omitted unless necessary. The term "connection" does not mean only "direct connection" but "connection via another or other elements".

In general, according to one embodiment, an electronic device comprises a memory that stores dictionary data indicative of a relationship between a voice command and command data corresponding to the voice command, a voice input receiver that receives a voice, and a hardware processor that recognizes the received voice and determines the command data corresponding to the recognized voice command of the received voice using the dictionary data. The dictionary data comprises first dictionary data and second dictionary data. The second dictionary data comprises updatable data. A number of voice commands in the first dictionary data is greater than a number of voice commands in the second dictionary data. The first dictionary data is divided into a plurality of sub dictionaries. The hardware processor recognizes the received voice using at least one of the sub dictionaries or the second dictionary data.

[Remote Support System]

FIG. 1 is a block diagram showing an example of a remote support system which is one of application examples of an electronic device according to the embodiment. The application example of the electronic device is not limited to the remote support system. The remote support system is a system that supports the user (for example, a worker at a job site) by an operator at the rear from a remote location. Examples of field work include complicated maintenance work, picking work in a distribution warehouse, monitoring, disaster relief/medical support, and the like. The user side at the job site is also called a front end, and the operator side at the rear is also called a back end.

The remote support system is formed of a mobile PC 16 carried by the user, a remote support center (data center) 18 located at a position distant from the user, and a network 22 that connects the mobile PC 16 and the remote support center 18 to each other to enable communication between them. The mobile PC 16 and the remote support center 18 may be connected to the network 22 via wired LAN cables or may be connected to the network 22 via a wireless LAN, Bluetooth (registered trade mark) or the like. The mobile PC 16 has high degrees of general versatility and processing capability which can be used at a job site. The mobile PC 16 is sometimes called a mobile edge computing device.

If the mobile PC 16 is provided with a hardware keyboard for text input or a display device, the portability is spoiled, and it is difficult for the user to concentrate on the work. In order to solve the problem, the mobile PC 16 is not provided with a display device or a hardware keyboard. When an eyeglass type or a goggle type wearable device is connected to the mobile PC 16, a display device of the wearable device can be utilized as a display device of the mobile PC 16, and hence the user can confirm the display while working. Thereby, it is expected that the operational efficiency is promoted and the productivity is improved at the lob site or the like, or load dispersion of data and improvement in the network environment can be achieved.

A wearable device, such as an eyeglass type wearable device 23 is connected to the mobile PC 16. Although FIG. 1 shows an example in which the wearable device 23 is connected to the mobile PC 16 via a cable, the wearable device 23 may also be connected to the mobile PC 16 via a wireless LAN, Bluetooth or the like. The wearable device 23 is provided with a display device, a touch pad, and the like. Accordingly, an image transmitted from the mobile PC 16 is displayed on the display device, and a command or the like is input from the touch pad.

As shown in FIG. 1, it is also possible for a plurality of users to communicate with each other via the network 22. In this case, communication may also be carried out via the remote support center 18, and communication may also be carried out only between the users without being carried out via the operator of the remote support center 18.

The remote support center 18 is provided with an operator terminal 12 and a server 14. The remote support center 18 makes a voice call or information exchange between the mobile PC 16 (wearable device 23) and the operator terminal 12. It is possible to carry out video distribution of a real-time image shot by the wearable device 23 (connected to the mobile PC 16) to the operator terminal 12, and it is also possible to carry out mutual transmission/reception of an image between the mobile PC 16 and the operator terminal 12. Further, it is also possible to transmit a text message from the operator terminal 12 to the mobile PC 16. For example, in the picking operation at the distribution warehouse, a place of a picking item is displayed on the wearable device 23, whereby hands-free picking can be realized.

The remote support typically includes, for example, the following functions:

(1) A voice call function of carrying out an interactive voice call between the mobile PC 16 and the operator terminal 12.

(2) A live image distribution function of carrying out video distribution of a real-time image shot by the wearable device 23 to the operator terminal 12 during a voice call.

(3) A function of carrying out transmission/reception of a still image between the mobile PC 16 and the operator terminal 12 during a voice call (The mobile PC 16 transmits a shot still image or a captured image being video-distributed to the operator terminal 12. The operator terminal 12 edits the received image by writing characters or pictures, and transmits the edited image to the mobile PC 16. The still image received by the mobile PC 16 is stored in a folder in the mobile PC 16, and can be browsed).

(4) A screen sharing function of displaying the entire desk-top screen of the operator terminal 12 or a window of an arbitrary application program on the wearable device 23 during a voice call.

(5) A text message transmitting function of transmitting a text message from the operator terminal 12 to the mobile PC 16.

The server 14 carries out processing for remote support in place of or in cooperation with the operator terminal 12. The server 14 is provided with a hardware processor (CPU) 28, ROM 30, RAM 32, and a storage device 34 such as a hard disk drive (HDD) or solid-state drive (SSD), and interface 36. The operator terminal 12 may be made to have all the functions of the server 14, and the server 14 may be omitted.

[Operator Terminal 12]

FIG. 2 is a block diagram showing an exemplary structure of the operator terminal 12. The operator terminal 12 may be formed of a desktop PC, notebook PC or the like. The operator using the operator terminal 12 confirms the situation of the workplace on the basis of a real-time image transmitted from the mobile PC 16 and issues an instruction to the user having the mobile PC 16 with a conversation or an image. The operator can write text or characters to the image file received from the mobile PC 16 to edit the image file, transmit the edited image file to the mobile PC 16, and store the edited image file into the operator terminal 12.

The operator terminal 12 is provided with a system controller 42 including a hardware processor. A main memory 44, a BIOS-ROM 50, a storage device 52 such as an HDD or an SSD, an audio codec 54, a graphics controller 62, a touch panel 70, a USB (registered trade mark) connector 72, a wireless LAN device 74, a Bluetooth device 76, a wired LAN device 78, a PCI Express (registered trade mark) card controller 80, a memory card controller 82, an embedded controller/keyboard controller (EC/KBC) 84, and the like are connected to the system controller 42.

The system controller 42 executes various programs to be loaded from the storage device 52 into the main memory 44. These programs include an operating system (OS) 46, and a back end application program (hereinafter called back end application) 48 for remote support. The system controller 42 also executes the Basic Input/Output System (BIOS) stored in the BIOS-ROM 50 which is a nonvolatile memory. The BIOS is a system program for hardware control.

The audio codec 54 converts a digital audio signal which is an object to be reproduced into an analog audio signal, and supplies the converted analog audio signal to a headphone 58 or a speaker 60. Further, the audio codec 54 converts an analog audio signal input thereto from a microphone 56 into a digital signal. The microphone 56 and headphone 58 may be provided singly, and may also be provided in an integrated manner as an intercom.

The graphics controller 62 controls a liquid crystal display (LCD) 64 to be used as a monitor of the operator terminal 12. The touch panel 70 is overlaid on the screen of the LCD 64, and allows a handwriting input operation to be carried out on the screen of the LCD 64 by means of a touch-pen or the like. An HDMI (registered trade mark) controller 66 is also connected to the graphics controller 62. The HDMI controller 66 is connected to an HDMI connector 68 for connection to an external display device (not shown).

The wireless LAN device 74 executes wireless LAN communication of the IEEE 802.11 standard for the purpose of connection to the network 22. The Bluetooth device 76 executes wireless communication of the Bluetooth standard for the purpose of connection to an external device (not shown). The wired LAN device 78 executes wired LAN communication of the IEEE 802.3 standard for the purpose of connection to the network 22. As described above, the connection between the operator terminal 12 and the network 22 may be made by wireless communication or may be made by wired communication.

The PCI Express card controller 80 carries out communication of the PCI Express standard between the operator terminal 12 and an external device (not shown). The memory card controller 82 writes data into a storage medium (not shown), for example, a memory card such as an SD (Secure Digital) card (registered trade mark), and reads data from the memory card.

The EC/KBC 84 is a power management controller, and is realized as a one-chip microcomputer incorporating therein also a keyboard controller that controls a hardware input keyboard 88. The EC/KBC 84 has a function of setting the operator terminal 12 to a power-on state, a power-off state, a sleep state, or a hibernation state and a function of restoring the operator terminal 12 from the sleep state or the hibernation state to the power-on state according to an operation of a power switch 86. Control of the power-on state, the power-off state, the sleep state, or the hibernation state is executed by cooperation between the EC/KBC 84 and a power circuit 90. Even while the operator terminal 12 is in the power-off state, the EC/KBC 84 operates by power from a battery 92 or an AC adaptor 94 (to be connected as an external electric power supply). The power circuit 90 uses the power from the battery 92 or from the AC adaptor 94 to generate the power to be supplied to each component.

[Wearable Device 23]

Figure 3:
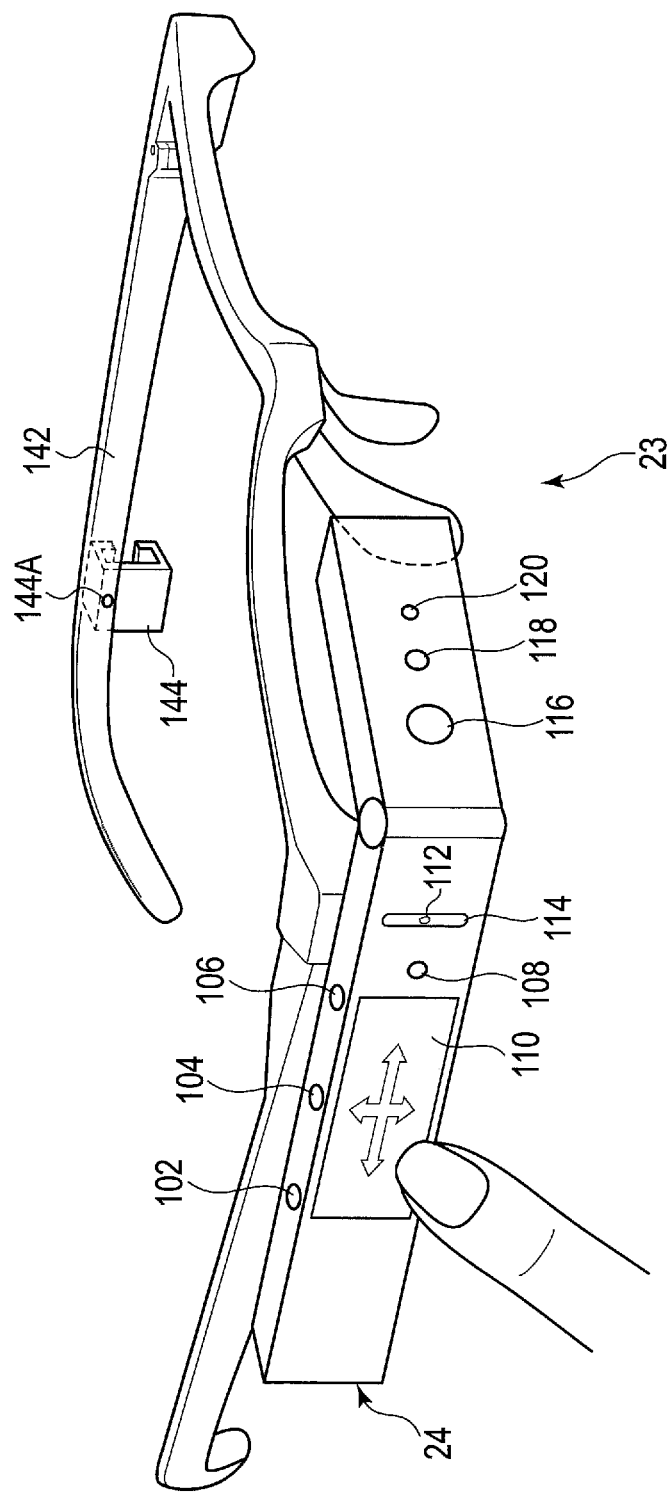
FIG. 3 is a view showing an example of an external appearance of a wearable device 23 to be connected to a mobile PC 16 in FIG. 1.

FIG. 3 shows an example of an external appearance of the wearable device 23 to be connected to the mobile PC 16. The wearable device 23 is formed of an eyeglass frame 142 and a wearable device main body 24. The eyeglass frame 142 may have a shape obtained by removing lenses from general eyeglasses and is worn on the face of the user. The eyeglass frame 142 may have a structure to which eyeglasses can be attached. When the user habitually uses eyeglasses at all times, lenses of degrees identical to the habitually used eyeglasses may be attached to the eyeglass frame 142.

The eyeglass frame 142 is provided with mounting brackets 144 on both the right and left temples thereof. The wearable device main body 24 is attached to and detached from one of the mounting brackets 144 on the right temple or the left temple. In FIG. 3, the wearable device main body 24 is attached to the mounting bracket 144 on the right temple of the user so that the mounting bracket 144 on the right temple is hidden behind the wearable device main body 24, and hence is not shown. As described above, the wearable device main body 24 is provided with a display device 124 (shown in FIG. 4). The display device 124 is viewed by one eye. Therefore, the mounting brackets 144 are provided on both the right temple and the left temple so that the wearable device main body 24 can be attached to the mounting bracket on the dominant eye side. The wearable device main body 24 need not be detachably attached to the eyeglass frame 142 by means of the mounting bracket 144. The wearable device for the right eye only may be prepared in which the wearable device main body 24 is fixed to the right temple of the eyeglass frame 142. The wearable device for the left eye only may be prepared in which the wearable device main body 24 is fixed to the left temple of the eyeglass frame 142. Furthermore, the wearable device main body 24 may not be attached to the eyeglass frame 142, but may be attached to the head of the user by using a helmet or a goggle.

An engaging piece 128 (shown in FIG. 4) of the wearable device main body 24 is forced between upper and lower frames of the mounting bracket 144, whereby the wearable device main body 24 is attached to the eyeglass frame 142. When the wearable device main body 24 is to be detached from the eyeglass frame 142, the wearable device main body 24 is plucked out of the mounting bracket 144.

In a state where the wearable device main body 24 is attached to the mounting bracket 144, the engaging piece 128 is somewhat movable backward and forward in the mounting bracket 144. Accordingly, the wearable device main body 24 is adjustable in the front-back direction so that the user's eye can be brought to a focus on the display device 124. Furthermore, the mounting bracket 144 is rotatable around an axis 144A perpendicular to the temple. After the wearable device main body 24 is attached to the eyeglass frame 142, the wearable device main body 24 is adjustable in the upward or the downward direction so that the display device 124 can be positioned on the user's line of sight. Moreover, the rotational angle of the mounting bracket 144 is about 90 degrees and, by largely rotating the mounting bracket 144 in the upward direction, the wearable device main body 24 can be flipped up from the eyeglass frame 142. Thereby, even when it is difficult to watch the real thing because the field of view is obstructed by die wearable device main body 24 or even when the wearable device main body 24 interferes with surrounding objects in a small space, it is possible to temporarily divert/restore the wearable device main body 24 from/to the field of view of the user without detaching/reattaching the entire wearable device 23 from/to the face of the user.

The wearable device main body 24 is formed of a side part to be along the temple of the eyeglass frame 142, and a front part to be positioned on the line of sight of one eye of the user. The angle which the front part forms with the side part is adjustable. As shown in FIG. 3, on the outside surface of the front part, a camera 116, a light 118, and a camera LED 120 are provided. The light 118 is an auxiliary lighting fixture emitting light at the time of shooting a dark object. The camera LED 120 is turned on at the time of shooting a photograph or a video to thereby cause the objective person to be shot to recognize that he or she is to be shot.

On the top surface of the side part of the wearable device main body 24 attached to the right side temple, first, second, and third buttons 102, 104, and 106 are provided. When the dominant eye of the user is the left eye, the wearable device main body 24 is attached to the left side temple. The top and the bottom of the wearable device main body 24 are reversed according to whether the wearable main body 24 is attached to the right side temple or the left side temple. Therefore, the first, second, and third buttons 102, 104, and 106 may be provided on both the top surface and the bottom surface of the side part.

On the outside surface of the side part, a touch pad 110, a fourth button 108, a microphone 112, and an illuminance sensor 114 are provided. The touch pad 110 and the fourth button 108 can be operated by a forefinger. When the wearable device main body 24 is attached to the right side temple, the buttons 102, 104, and 106 are arranged such that the buttons 102, 104, and 106 can be operated by a forefinger, a middle finger, and a third finger, respectively.

The touch pad 110 detects the movement of finger in up and down directions or back and forth directions on the surface on the touch pad 110 as indicated by arrows. The movement to be detected includes flicking of a finger for grazing the surface quickly in addition to dragging of a finger for moving the finger with the finger kept in contact with the surface. Upon detection of up-and-down or back-and-forth movement of the user's finger, the touch pad 110 inputs a command. In this description, the command implies an executive instruction to execute specific processing to be issued to the wearable device main body 24. The instruction is input to the main body 24, as a key code.

Operation procedures for the first to fourth buttons 102, 104, 106, and 108, and the touch pad 110 are determined in advance by the application program.

For example,
when the third button 106 is pressed once, a key code for item selection/item execution is generated,
when the third button 106 is pressed for a long time, a key code for displaying a list of activated application programs is generated,
when the second button 104 is pressed once, a key code for returning the screen to the home screen is generated,
when the second button 104 is pressed for a long time, a key code for a menu of quick settings is generated, and
when the first button 102 is pressed once, a key code for cancelling an operation (a key code of Esc key of the keyboard) is generated.

Regarding the operation of the touch pad 110, for example,
when the touch pad 110 is dragged up or down, a key code for moving up and down the cursor is generated,
when the touch pad 110 is flicked forward (to the front of the head), a key code for selecting the left icon (continuously scrolling) is generated,
when the touch pad 110 is flicked backward (to the back of the head), a key code for selecting the right icon (continuously scrolling) is generated,
when the touch pad 110 is dragged forward, a key code for selecting the left icon (scrolling items one by one) is generated, and
when the touch pad 110 is dragged backward, a key code for selecting the right icon (scrolling items one by one) is generated. The up, down, right, and left directions correspond to the directions on the touch pad 110 when the wearable device main body 24 is attached to the right side temple. If the wearable device main body 24 is attached to the left side temple, the up, down, right, and left directions are reversed to the directions described above.

The first button 102 is arranged at such a position as to be operated by a forefinger, the second button 104 at a position by a middle finger, the third button 106 at a position by a third finger, and the fourth button 108 at a position by a little finger. The reason why the fourth button 108 is provided not on the top surface of the side part, but on the outside surface of the side part in FIG. 3 is that there is no space for the fourth button 108 on the top surface. The fourth button 108 may be provided on the top surface of the side part in the same manner as the first to third buttons 102, 104, and 106 if the top surface has an enough space. The illuminance sensor 114 detects the illuminance of the surrounding area in order to automatically adjust the brightness of the display device 124.

Figure 4:
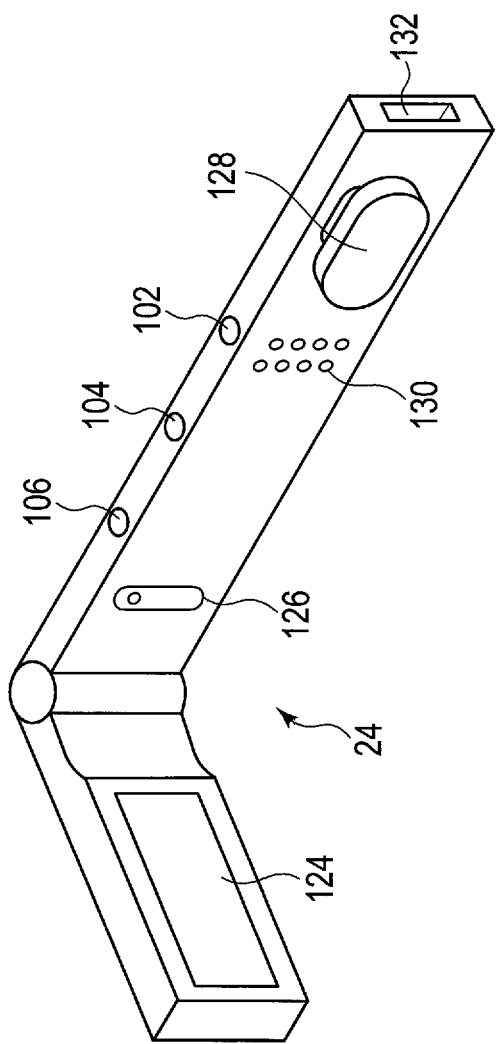
FIG. 4 is a view showing an example of an external appearance of a wearable device main body 24.

FIG. 4 shows an example of an external appearance of the back side of the wearable device main body 24. On the inner side of the front part, the display device 124 is provided. On the inner side of the side part, a microphone 126, a speaker 130, and the engaging piece 128 are provided. The microphone 126 is provided at a front position of the side part, and the speaker 130 and the engaging piece 128 are provided at a rear position of the side part. Headphones may be used in place of the speaker 130. In this case, the microphone 126 and the headphones may also be provided in an integrated manner as an intercom in the same manner as the operator terminal 12.

FIG. 5 shows an example of connection between the mobile PC 16 and the wearable device main body 24. At a rear position of the side part, a receptacle 132 into which a plug 146A at one end of a USB type-C (registered trade mark) cable 146 conforming to the USB type-C standard is to be inserted is provided. The receptacle 132 and the plug 146A may be generally called a connector. A plug 146B at the other end of the USE type-C cable 146 is to be inserted into a receptacle 207 conforming to the USB type-C standard provided on an upper end face of the mobile PC 16. The receptacle 207 and the plug 146B may be generally called a connector. As described above, the wearable device main body 24 is connected to the mobile PC 16 via the USB type-C cable 146, and an image signal and the USB signal are transmitted from/to the wearable device main body 24 to/from the mobile PC 16 via the USB type-C cable 146. The wearable device main body 24 may also be connected to the mobile PC 16 by means of wireless communication such as a wireless LAN, Bluetooth, and the like.

Figure 6:
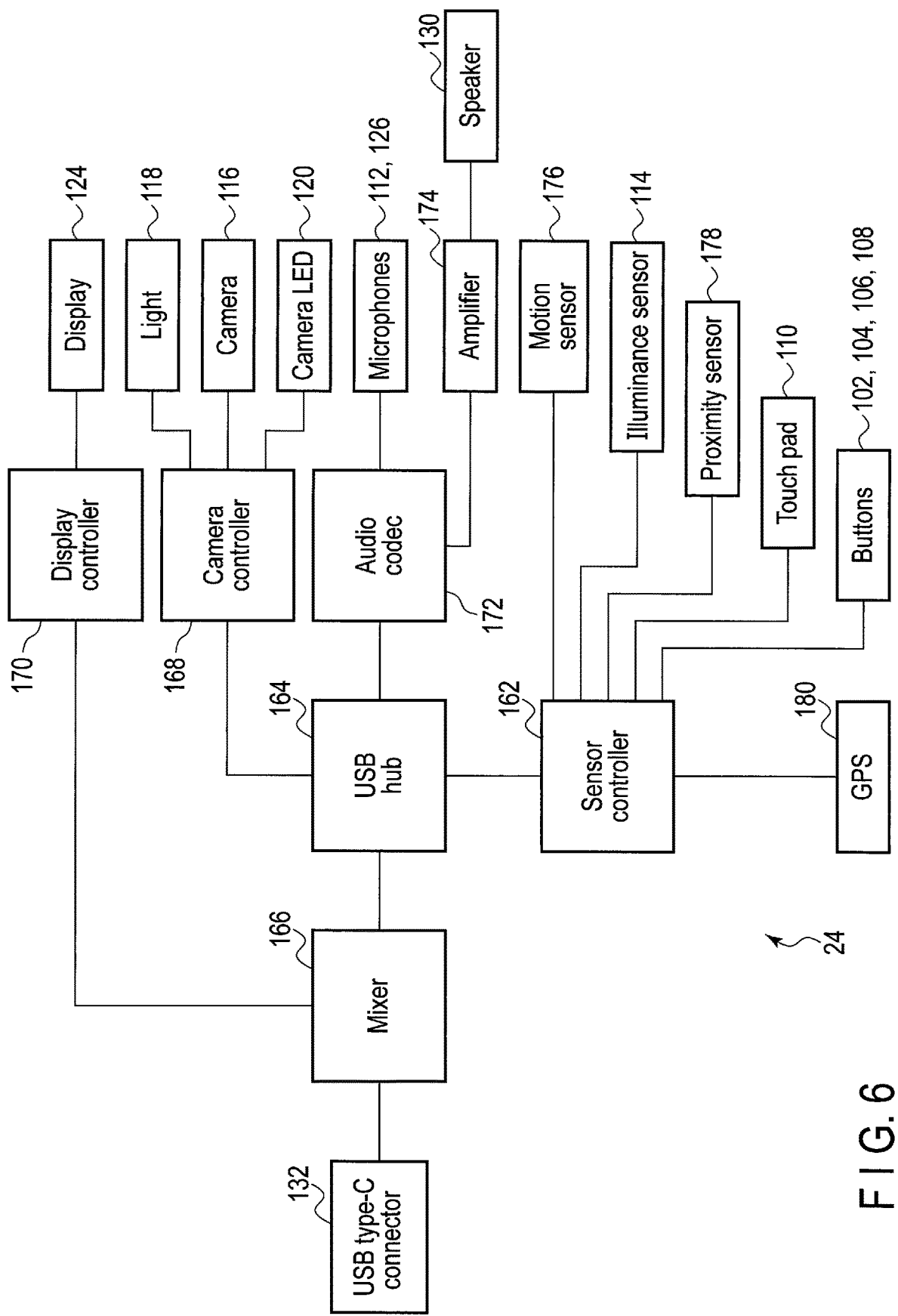
FIG. 6 is a block diagram showing an exemplary structure of the wearable device main body 24.

In the embodiment, the wearable device main body 24 is not provided with a battery or a DC terminal serving as a drive power supply, and the drive power is supplied from the mobile PC 16 to the wearable device main body 24 via the DSP type-C cable 146. However, the wearable device main body 24 may also be provided with a drive power supply. FIG. 6 is a block diagram showing an exemplary structure of the wearable device main body 24. The USE type-C connector 132 is connected to a mixer 166. A display controller 170 and a USB hub 164 are respectively connected to a first terminal and a second terminal of the mixer 166. The display device 124 is connected to the display controller 170. The display device 124 is built-in the wearable device main body 24 in this example. An external display device may be connected to the display controller 170 via a cable, such as an HDMI cable.

A camera controller 168, an audio codec 172, and a sensor controller 162 are connected to the USE hub 164. The camera 116, the light 118, and the camera LED 120 are connected to the camera controller 168. Audio signals from the microphones 112 and 126 are input to the audio codec 172, and an audio signal from the audio codec 172 is input to the speaker 130 via an amplifier 174. In the example of FIG. 6, although the camera 116, the audio codec 172, the sensor controller 162, and the like are built-in the wearable device main body 24, these devices may also be external devices. For example, a USE standard connector (receptacle) may be provided in the device main body 24, and the camera, the audio codec, the sensor controller, and other USE devices which are external devices may be connected to the USB hub 164 via a USE standard cable.

A motion sensor (for example, an acceleration sensor, a geomagnetism sensor, a gravitation sensor, a gyroscopic sensor, etc.) 176, the illuminance sensor 114, a proximity sensor 178, the touch pad 110, the first to fourth buttons 102, 104, 106, and 108, and a GPS sensor 180 are connected to the sensor controller 162. The sensor controller 162 processes detection signals from the motion sensor 176, the illuminance sensor 114, the proximity sensor 178, the touch pad 110, the first to fourth buttons 102, 104, 106, and 108, and the GPS sensor 180, and supplies a command to the mobile PC 16. Although not shown in FIG. 4, the motion sensor 176 and the proximity sensor 178 are arranged inside the wearable device main body 24. The motion sensor 176 detects a motion, a direction, a posture and the like of the wearable device main body 24. The proximity sensor 178 detects attachment of the wearable device 23 on the face of the user on the basis of approach of a face, a finger and the like of the user thereto. Although the wearable device main body 24 is one device, the wearable device main body 24 is a composite device in which the plurality of devices described above are accommodated in housing.

[Mobile PC 16]

Figure 7:
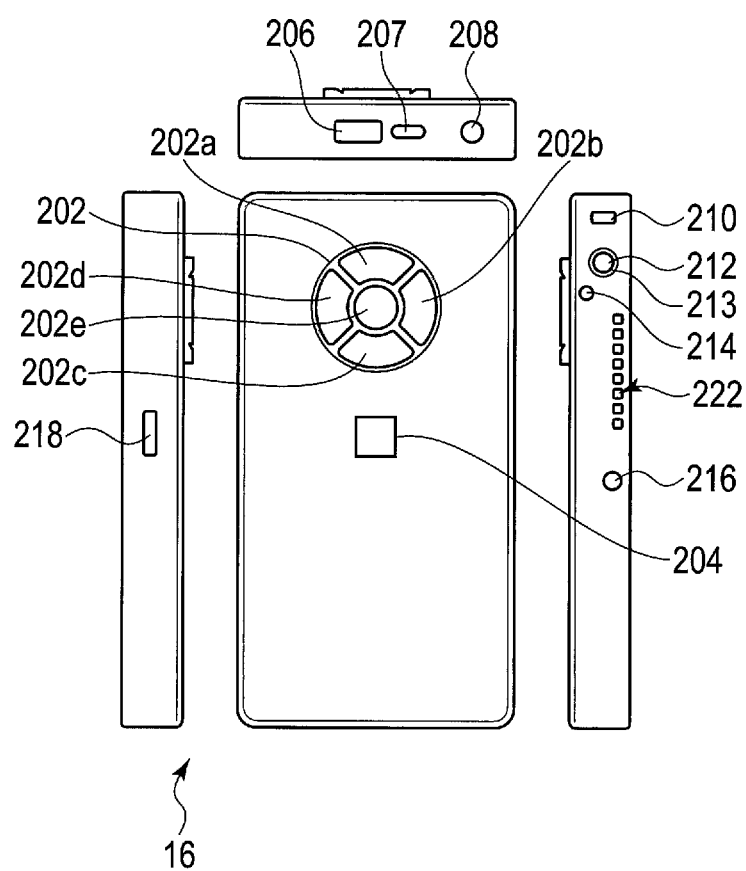
FIG. 7 is a view showing an example of an external appearance of the mobile PC 16.

FIG. 7 shows an example of an external appearance of the mobile PC 16. The mobile PC 16 is a small-sized PC that can be held by one hand, and has a small size and light weight, i.e., a width thereof is about 10 cm or less, a height thereof is about 18 cm or less, a thickness thereof is about 2 cm or less, and a weight thereof is about 300 gram or less. Accordingly, the mobile PC 16 can be held in a pocket of the work clothing of the user, a holster to be attached to a belt, or a shoulder case, and is wearable. Although the mobile PC 16 incorporates therein semiconductor chips such as a CPU, a semiconductor memory and like, and storage devices such as an SSD and the like, the mobile PC 16 is not provided with a display device and a hardware input keyboard for inputting characters or numerals.

On the front surface of the mobile PC 16, five buttons 202 constituted of an up button 202a, a right button 202b, a down button 202c, a left button 202d, and a decision button 202e (also called a center button or an enter button) are arranged. A fingerprint sensor 204 is arranged below the five buttons 202. The mobile PC 16 is not provided with a hardware input keyboard for inputting characters or numerals. Thus, a password (also called a PIN) cannot be input. Therefore, the fingerprint sensor 204 is used for user authentication at the time of sign-in of the mobile PC 16. The five buttons 202 can input a command.

User authentication at the time of sign-in may be carried out by assigning numeric values or alphabets to the buttons 202a to 202d of the five buttons 202, and by inputting a password using the five buttons 202. In this case, the fingerprint sensor 204 can be omitted. Numeric values or alphabets are assigned to the four buttons 202a to 202d other than the decision button 202e, and the assignable number of the numeric values or alphabets is only four. Thus, there is a possibility of numeric values or alphabets input in a random manner being coincident with the password. However, by making the digit number of the password large, it is possible to make the probability that the numeric values or alphabets input in a random manner will be coincident with the password low. Authentication by the five buttons 202 may be enabled in also the mobile PC 16 provided with the fingerprint sensor 204. Although one mobile PC 16 may be shared among a plurality of users, it is not possible to cope with such a case by only the fingerprint authentication.

The five buttons 202 can generate the same key codes as the buttons 102, 104, 106, and 108, and the touch pad 110 of the wearable device main body 24 generate. The user cannot watch the state where the buttons 102, 104, 106, and 108, and the touch pad 110 of the wearable device main body 24 are being operated. Therefore, it may be necessary for a user to become accustomed to carrying out an intended operation depending on the user. Further, the buttons 102, 104, 106, and 108 and the touch pad 110 are small in size, and thus they may be difficult to operate. In the embodiment, the five buttons 202 of the mobile PC 16 can also be operated in the manner same as the buttons 102, 104, 106, and 108 and the touch pad 110, and hence the above-mentioned difficulty may be overcome. The operation procedures of the five buttons 202 are determined by the application program. The up, down, right, and left directions of the five buttons 202 correspond to the directions on the touch pad 110 when the wearable device main body 24 is attached to the right side temple. If the wearable device main body 24 is attached to the left side temple, the up, down, right, and left directions of the five buttons 202 are reversed to the directions described above.

For example, when the decision button 202e is pressed once, a key code for item selection/item execution is generated (pressing once of the decision button 202e corresponds to pressing once of the third button 106 in the wearable device main body 24), when the decision button 202e is pressed for a long time, a key code for ending or cancelling an operation is generated (long-time pressing of the decision button 202e corresponds to pressing once of the first button 102 in the wearable device main body 24), when the up button 202a is pressed once, a key code for moving the cursor upward is generated (pressing once of the up buttons 202a corresponds to upward drag on the touch pad 110 in the wearable device main body 24), when the up button 202a is pressed for a long time, a key code for displaying a list of activated application programs is generated (long-time pressing of the up buttons 202a corresponds to pressing the third button 106 for a long time in the wearable device main body 24), when the down button 202c is pressed once, a key code for moving the cursor downward is generated (pressing once of the down button 202c corresponds to downward drag on the touch pad 110 in the wearable device main body 24), when the down button 202c is pressed for a long time, a key code for displaying a menu of quick settings is generated (long-time depressing of the down button 202c corresponds to pressing of the second button 104 for a long time in the wearable device main body 24), when the left button 202d is pressed once, a key code for selecting the right icon is generated (pressing one of the left button 202d corresponds to backward drag/flick on the touch pad 110 in the wearable device main body 24), and when the right button 202b is pressed once, a key code for selecting the left icon is generated (pressing once the right button 202b corresponds to forward drag/flick on the touch pad 110 in the wearable device main body 24).

On the upper side face of the mobile PC 16, a USB 3.0 connector 206, the USB type-C connector 207, and an audio lack 208 are provided. On one side face (side face on the left side when viewed from the front) of the mobile PC 16, a memory card slot 218 for a memory card is provided. The memory card includes, for example, an SD card (registered trade mark), a micro SD card (registered trade mark), and the like.

On the other side face (side face on the right side when viewed from the front) of the mobile PC 16, a slot 210 for Kensington Lock (registered trade mark), a power switch 212, a power LED 213, a DC IN/battery LED 214, a DC terminal 216, and ventilation holes 222 for cooling are provided. The power LED 213 is arranged around the power switch 212, and turned on during the period of power-on. The DC IN/battery LED 214 indicates the state of the mobile PC 16 such as whether or not the battery 352 is being charged, and the remaining battery level. Although the mobile PC 16 can be driven by the battery 352, the mobile PC 16 can also be driven in the state where an AC adaptor 358 (shown in FIG. 8) is connected to the DC terminal 216. Although not shown, the back side of the mobile PC 16 is configured such that a battery 352 (shown in FIG. 8) can be replaced with a new one by a one-touch operation.

Figure 8:
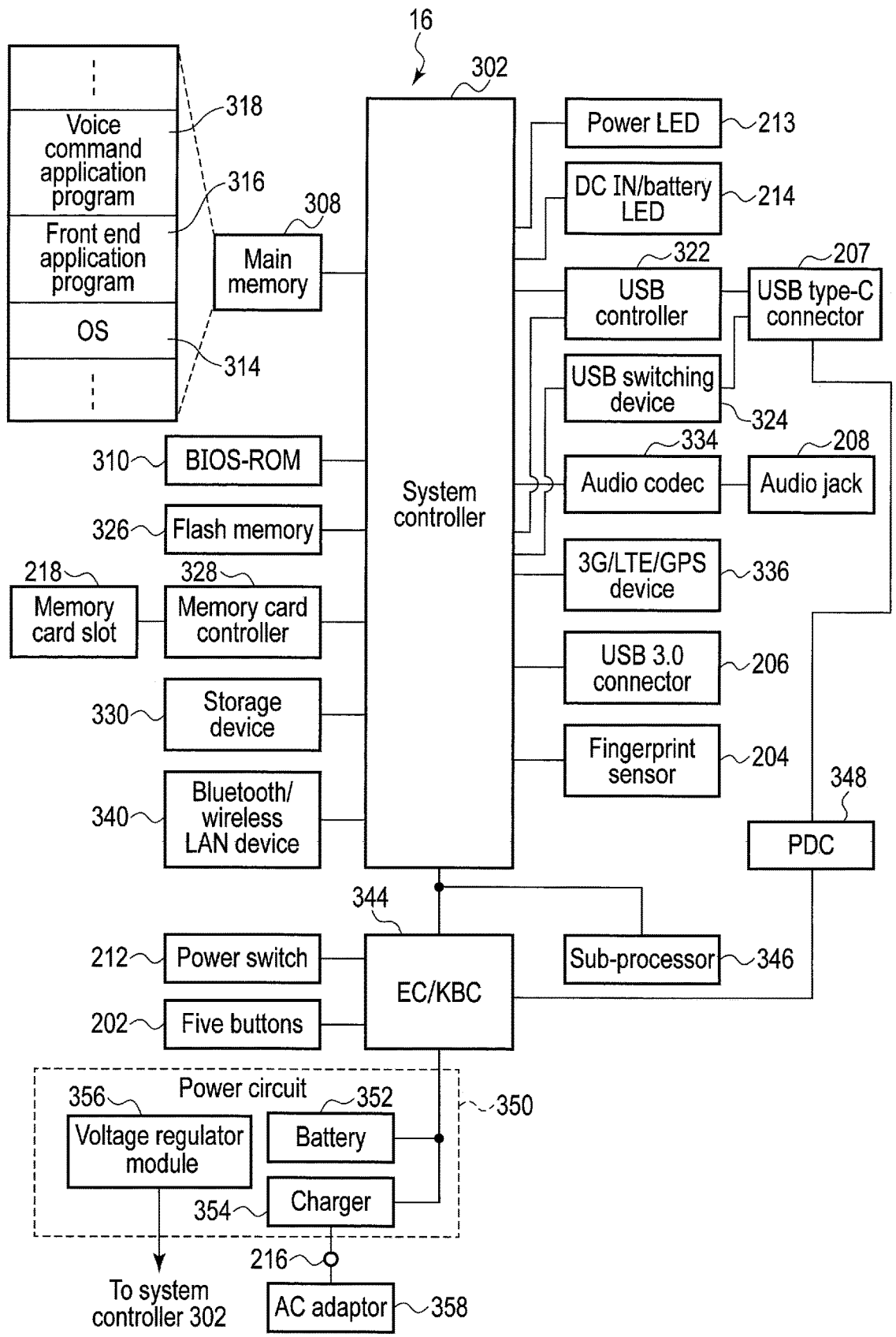
FIG. 8 is a block diagram showing an exemplary structure of the mobile PC 16.

FIG. 8 is a block diagram showing an exemplary structure of the mobile PC 16. The mobile PC 16 can carry out video distribution of an image shot by the wearable device main body 24 to the operator terminal 12, and enables browse of the image received from the operator terminal 12. For this reason, the mobile PC 16 is provided with a camera function, a viewer function, a file management function, and a communication function. The camera function is a function of shooting a photograph or a video by means of the camera 116 of the wearable device main body 24. The shot photograph and video are stored in a camera folder (not shown) in the mobile PC 16, and can be browsed by the viewer function. The viewer function is a function of enabling browse of a file stored in the camera folder. The types of the files include still images, moving images, PDF files, photographs and videos shot by the camera function, images received from the operator terminal 12, images transmitted to the operator terminal 12, and files stored in a user folder (not shown) in the mobile PC 16. The file management function is a function managing the files stored in the camera folder. Management may include changing a file name and deleting a file. Communication function is a function communicating with other persons. The other persons may include an operator of the operator terminal 12 or a third person.

The mobile PC 16 is provided with a system controller 302. The system controller 302 is formed of a hardware processor (CPU) and a controller/hub (not shown in FIG. 8). A main memory 308, a BIOS-ROM 310, the power LED 213, the DC IN/battery LED 214, and a USE controller 322 are connected to the hardware processor of the system controller 302. A flash memory 326, a memory card controller 328 storage device 330 such as an HDD or an SSD, a USE switching device 324, an audio codec 334, a 3G/LTE/GPS device 336, the fingerprint sensor 204, the USE 3.0 connector 206, a Bluetooth/wireless LAN device 340, and an EC/KBC 344 are connected to the controller/hub of the system controller 302.

The system controller 302 executes various programs to be loaded from the storage device 330 into the main memory 308. These programs include an OS 314, a front end application program (herein called front end application) 316 for remote support, a voice command application program (herein called audio command application) 318, and the like. The front end application 316 realizes a remote support system with the back end application 48 of the operator terminal 12. The front end application 316 includes a camera application, a viewer application, a file management application, and a communication application. However, these applications may be included in the back end application 48 of the operator terminal 12, instead of the front end application. The system controller 302 also executes the Basic Input/Output System (BIOS) stored in the BIOS-ROM 310 which is a nonvolatile memory. The BIOS is a system program for hardware control.

The audio codec 334 converts a digital audio signal which is an object to be reproduced into an analog audio signal, and supplies the converted analog audio signal to the audio jack 208. Further, the audio codec 334 converts an analog audio signal input from the audio jack 208 into a digital signal.

The memory card controller 328 accesses to a memory card such as an SD card to be inserted into the memory card slot 218, and controls read/write of data from/to the SD card. The USB controller 322 carries out control of transmission/reception of data to/from the USB type-C cable 146 (shown in FIG. 5) connected to the USB type-C connector 207 or the USB 3.0 cable (not shown) connected to the USB 3.0 connector 206.

The Bluetooth/wireless LAN device 340 executes wireless communication conforming to the Bluetooth/IEEE 802.11 standard for the purpose of connection to the network 22. The connection to the network 22 may not depend on wireless communication, and may depend on wired LAN communication conforming to the IEEE 802.3 standard.

The fingerprint sensor 204 is used for fingerprint authentication at the time of startup of the mobile PC 16. A sub-processor 346, a USB Power Delivery Controller (called PDC) 348, the power switch 212, and the five buttons 202 are connected to the EC/KBC 344. The EC/KBC 344 has a function of turning on or turning off the power to the mobile PC 16 according to the operation of the power switch 212. The control of power-on and power-off is executed by cooperative operation of the EC/KBC 344 and the power circuit 350. Even during a power-off period of the mobile PC 16, the EC/KBC 344 operates by the power from a battery 352 or an AC adaptor 358 (connected as an external power supply). The power circuit 350 uses the power from the battery 352 or the AC adaptor 358 to thereby generate power to be supplied to each component. The power circuit 350 includes a voltage regulator module 356. The voltage regulator module 356 is connected to the hardware processor in the system controller 302. The PDC 348 is connected the USE type-C connector 207, and carries out power-supply control for the USE type-C connector 207 according to the control from the EC/KBC 344. Upon receipt of a USE reconnection command (HCI command to be described later) from the EC/KBC 344, the PDC 348 once turns off the power supplied by the mobile PC 16 to the USE type-C connector 207, and carries out device scanning for detecting a device or devices connected to the USE type-C connector 207. The device scanning can be carried out even when the USE type-C connector 207 is not powered. The PDC 348 carries out communication with the device detected by the device scanning to determine whether power should be supplied to the device from the mobile PC 16 or power should be supplied to the mobile PC 16 from the device. The wearable device main body 24 of the example has no power supply capability, and hence power is supplied from the mobile PC 16 to the wearable device main body 24 at all times in the example. When power is supplied from the mobile PC 16 to the wearable device main body 24, the OS 314 of the mobile PC 16 detects that the wearable device main body 24 has been connected to the mobile PC 16.

Although the mobile PC 16 is constituted as a body separate from the wearable device main body 24, the mobile PC 16 may be incorporated into the wearable device main body 24, and both of them may also be integrated into one body which is wearable to the user. Although not shown, a port extension adaptor including ports or connectors according to several interfaces can be connected also to the USB type-C connector 207, and an interface which is not provided in the mobile PC 16, such as the HDMI, RGB, wired LAN, and the like, can be used.

[Voice Recognition Device]

The front end application 316 of the mobile PC 16 realizes a remote support system in cooperation with the back end application 48 of the operator terminal 12, and thus, such a system may be regarded as a remote support application. The remote support system is operated on the basis of key codes input from the key board 88 and the touch panel 70 of the operator terminal 12, the five buttons 202 of the mobile PC 16, or the touch pad 110 and the buttons 102, 104, 106, and 108 of the device main body 24. The key codes correspond to the commands to the remote support system. Thus, a manual operation is required to input the commands, and in some cases, users may have difficulty in giving commands to the remote support application during the work.

In the embodiment, the mobile PC 16 includes the voice command application 318. When voices input from the microphones 112 and 126 of the device main body 24 are recognized, a key code corresponding to the voice command which is a result of recognition is generated. When the key code is input into the remote support application, a command is supplied to the remote support system.

The remote support application receives the command data output from the voice command application 318, recognizes the voice command corresponding to the command data, and performs an operation corresponding to the recognized voice command to achieve a function corresponding to the voice command. The format and type of the command data output from the voice command application 318 are those able to be interpreted by the remote support application, and thus, are optional. As an example of the command data, a key code can be used. The remote support application is, originally, structured to receive a key code from the key board, the touch panel, the button, or the touchpad, for example, as a command, and thus, if the voice command application 318 outputs a key code as command data, the remote support application does not need to change the structure thereof even if it is used together with the voice command application 318. When the voice command application 318 is structured to give a key code corresponding to a voice command to the remote support application, any remote support application which can receive a key code can be controlled and operated by a voice command using the voice command application 318. The key code corresponding to the voice command corresponds to a key code corresponding to a command received by the remote support application. For example, if a photograph is taken in the remote support application by pressing an Enter key, a voice command corresponding to taking of a photography is recognized, and then, a key code of the Enter key is generated.

Thus, the user can use the remote support system in a hands-free manner, and a remote support of a back end operator and the like can easily be supplied to a worker of a front end.

FIG. 9 is a block diagram of an example of the function of the voice recognition device 400 realized by the voice command application 318. In the description, the voice command application 318 is included in the remote support system. However, the voice command application 318 can be utilized in any system receiving a voice command. The voice recognition device 400 includes, for example, a microphone 402, a voice input unit 406, a voice recognition unit 408, a key code output unit 412, a dictionary memory 414, a dictionary management unit 416, and a dictionary input unit 418.

The microphone 402 is connected to the voice input nit 406. The microphone 402 corresponds to, for example, the microphone 112 of the device main body 24 of FIG. 3, the microphone 126 of the device main body 24 of FIG. 4, or a microphone (which is not shown) connected to the audio jack 208 of the mobile PC 16 of FIG. 7. The voice input unit 406 corresponds to, for example, the audio codec 172 of the device main body 24 of FIG. 6, or the audio codec 334 of the mobile PC 16 of FIG. 8.

The voice input unit 406 divides the digital voice signal input from the microphone 402 word by word, and supplies the input voice signal including one or more words to the voice recognition unit 408. Note that the voice input unit 406 may input not only the voice signal directly input from a microphone but also a voice signal read from a voice file.

A dictionary used by the voice recognition unit 408 in the matching is generated in a host application 404 and supplied from the host application 404. The dictionary is a text format file indicative of a relationship between a voice command and command data. In this embodiment, the command data are, for example, a key code. The text format is, for example, a JSON (JavaScript Object Notation) file. Since the dictionary is a text format file, it can be rewritten by an operator or a user with an authority, if necessary. If the voice recognition device 400 is utilized in the remote support system, the host application 404 corresponds to, for example, the front end application 316 of the mobile PC 16 or the back end application 48 of the operator terminal 12.

The dictionary input unit 418 transmits the dictionary data received from the host application 404 to the dictionary management unit 416. If the host application 404 is the back end application 48 in the operator terminal 12, the dictionary input unit 418 corresponds to the 3G/LTE/GPS device 336 or the Bluetooth/wireless LAN device 340 of the mobile PC 16. If the host application 404 is the front end application 316 in the mobile PC 16, the dictionary input unit 418 may be omitted.

The dictionary management unit 416 writes the dictionary data received from the host application 404 to the dictionary memory 414. The dictionary memory 414 is a memory to store first dictionary data 422 and second dictionary data 421. The dictionary memory 414 is provided within the main memory 308 in the mobile PC 16.

The voice recognition unit 408 performs acoustic analysis and characteristics extraction with respect to the input voice signal supplied from the voice input unit 406. The voice recognition unit 408 also performs pattern matching of the input voice signal and the voice commands included in the first dictionary data 422 or the second dictionary data 424 in the dictionary memory 414, and performs voice recognition of the input voice signal. Whether the first dictionary data 422 or the second dictionary data 424 is used in the pattern matching may be determined by the host application 404. The voice recognition is to determine a voice command having a highest similarity to the input voice signal where the similarity is above a certain value. The voice recognition unit 408 reads a key code corresponding to the voice command determined by the voice recognition from the first dictionary data 422 or the second dictionary data 424, and supplies the key code to the key code output unit 412.

The dictionary management unit 416 and the voice recognition unit 408 correspond to the system controller 302 of the mobile PC 16. The key code output unit 412 transmits the key code to the host application 404. If the host application 404 is the back end application 48 of the operator terminal 12, the key code output unit 412 corresponds to the 3G/LTE/GPS device 336 of the mobile PC 16 or the Bluetooth/wireless LAN device 340. If the host application 404 is the front end application 316 of the mobile PC 16, the key code output unit 412 may be omitted.

[First Dictionary Data 422 and Second Dictionary Data 424]

The dictionary data stored in the dictionary memory 414 include, preferably, as many voice commands which may be used in the operation of the host application 404 as possible. Thus, if a great number of voice commands is included in the dictionary data in some host application 404, a time required to perform the recognition may become longer or a possibility of misrecognition may become higher. In order to prevent these problems, in the embodiment, as shown in FIG. 9, two types of dictionaries of the first dictionary data 422 and the second dictionary data 424 are prepared and one of them is selected.

The commands to operate the host application 404 can be classified to commands which change along the time lapse and commands which are basically fixed and do not change along the time lapse, on the basis of the function, status, and the like of the host application 404. For example, the commands used in the camera application or in the viewer application are basically fixed. Such a command may be referred to as a static command. Furthermore, commands used in the file management application or the communication application change along the time lapse. Such a command may be referred to as a dynamic command.

The first dictionary data 422 is generated based on the static command, and the second dictionary data 424 is generated based on the dynamic command. That is, the first dictionary data 422 is a static dictionary which does not require a change thereto after the generation of the first dictionary data 422 by the host application 404, unless the host application itself is changed. On the other hand, the second dictionary is a dynamic dictionary which requires a change thereto at each time when the function, status, or the like of the host application 404 is changed after the generation of the second dictionary data 424 by the host application 404.

Note that the static command group used in the camera application is different from the static command group used in the viewer application. Thus, the voice commands included in the first dictionary data 422 are divided into a plurality of groups (sub dictionaries) on the basis of the function, status, mode, and the like of the host application 404, and a tag name is added to each group. If the first dictionary data 422 is to be used, a group is selected from the groups.

FIG. 10 shows an example of the first dictionary data 422a and an example of the second dictionary data 424a in a case where the voice command is Japanese command. The group with the tag name of "camera" of the first dictionary data 422a (corresponding to the camera application) includes, for example, five voice commands "suchiru", "zumu in", "zumu auto", "bideo on", and "bideo ofu". The key code corresponding to the voice command "suchiru" is a key code of Enter key (instructing taking a still image). The key code corresponding to the voice command "zumu in" is a key code of Up key (instructing increasing magnification), the key code corresponding to the voice command "zumu auto" is a key code of Down key (instructing decreasing magnification), the key code corresponding to the voice command "bideo on" is a combination of key codes of Ctrl key and "s" key (instructing starting taking video), and the key code corresponding to the voice command "bideo ofu" is a combination of key codes of Ctrl key and "e" key (instructing ending taking video). That is, unique commands corresponding to the voice commands are not generated but the key codes are generated as the commands. Thus, a change to the command reception function of the host application 404 which is based on the key code input from the keyboard is not required to correspond to the commands unique to the voice command application 318. Furthermore, not only a single key code is generated with respect to the voice command but also a combination of key codes of different keys such as Ctrl key and alphabet/number key can be generated. Thus, a short cut key operation can be realized by the voice commands.

The group with the tag name of "viewer" of the first dictionary data 422a (corresponding to the viewer application) includes, for example, four commands of "zumu in", "zumu auto", "tsugi", and "mae". The key code corresponding to the voice command "zumu in" is a key code of Up key (instructing enlarging display), the key code corresponding to the voice command "zumu auto" is a key code of Down key (instructing undoing enlarged display), the key code corresponding to the voice command "tsugi" is a key code of Next key (instructing displaying next picture or video), and the key code corresponding to the voice command "mae" is a key code of Prev. key (displaying previous picture or video).

Note that, even in the same camera application or the viewer application, if the command groups are different in each of the functions and conditions (for example, GUI screen), a group is formed for each of the functions and conditions. On the other hand, the dynamic command can be expected from the history of command issuance. For example, commands expected to be used in the file management application are file names and operation names (delete, move, and the like), and file names to be selected later can be expected from the history of operation to a certain extent. Thus, when the host application 404 recognizes that a user uses the file management application, the host application 404 generates the second dictionary data 424a as shown in FIG. 10, and sends the second dictionary data 424a to the voice recognition device 400. The second dictionary data 424a is registered in the dictionary memory 414. The second dictionary data 424a related to the file management application includes, for example, five voice commands "sakura ichi", "sakura ni", "sakura san", "ume", and "derito". "Sakura" and "ume" correspond to cherry and Japanese apricot, respectively. The key code corresponding the voice command "sakura ichi" is a series of key codes of seven keys "s", "a", "k", "u", "r", "a", and "1" (instructing selecting picture/video of file name "sakura1"), the key code corresponding to the voice command. "sakura ni" is a series of key codes of seven keys "s", "a", "k", "u", "r", "a", and "2" (instructing' selecting picture/video of file name "sakura2"), the key code corresponding to the voice command "sakura san" is a series of key codes of seven keys "s", "a", "k", "u", "r", "a", and "3" (instructing selecting picture/video of file name "sakura3"), the key code corresponding to the voice command "ume" is a series of key codes of three keys "u", "m", and "e" (instructing selecting picture/video of file name "ume"), and the voice command corresponding to "derito" is a key code of Delete key (instructing deletion of selected picture/video).

Static commands of the whole first dictionary data 422a are many. However, the number of commands of each tag (each sub-dictionary) of the first dictionary data 422a is, in consideration of a time required for matching, that is, a recognition time, a possibility of misrecognition, and the like, limited to a small number such as 10 or less. The number of the dynamic commands of the second dictionary data 424a is set to be about the same as the static commands of the first dictionary data 422 of each tag.

Once the whole first dictionary data 422a including a large number of voice commands of each tag is written in the dictionary memory 414, the first dictionary data 422a is not rewritten until the voice recognition device 400 initialized. However, since the second dictionary data 424a stores a small number of commands (similar to the number of commands of each sub-dictionary), the second dictionary data 424a may be regenerated by the host application 404 at each time when the function, status, and the like of the host application 404 are changed. Thus, the second dictionary data 424a written the dictionary memory 414 is updated by the host application 404, needed.

When a user switches the application to be executed, in response to the switching, the host application 404 generates a new second dictionary data 424 and sends the new second dictionary data 424 to the voice recognition device 400. For example, when a user switches the application to be executed from the file management application to the communication application, the host application 404 generates second dictionary data 424b related to the communication application, and as shown in FIG. 11, the second dictionary data 424a related to the file management application in the dictionary memory 414 is rewritten to the second dictionary data 424b. Commands expected to be used in the communication application are addresses and operation names (call in, hang up, and the like), and addresses to be selected later can be expected from the history of communication to a certain extent. The second dictionary data 424b includes, for example, five voice commands "sato", "suzuki", "tanaka", "watanabe", and "tsuwa". The key code corresponding to the voice command "sato" is a series of key codes of four keys "s", "a", "t", and "o" (instructing selecting address of Mr. or Ms. "sato"), the key code corresponding to the voice command "suzuki" is a series of key codes of six keys "s", "u", "z", "u", "k", and "i" (instructing selecting address of Mr. or Ms. "suzuki"), the key code corresponding to the voice command "tanaka" is a series of key codes of six keys "t", "a", "n", "a", "k", and "a" (instructing selecting address of Mr. or Ms. "tanaka"), and the key code corresponding to the voice command "watanabe" is a series of key codes of eight keys "w", "a", "t", "a", "n", "a", "b", and "e" (instructing selecting address of Mr. or Ms. "watanabe"), and the key code corresponding to the voice command "tsuwa" is a series of key codes of Ctrl key and "1" key (instructing call in selected address).

[Generation of Second Dictionary Data 424]

Figure 12:
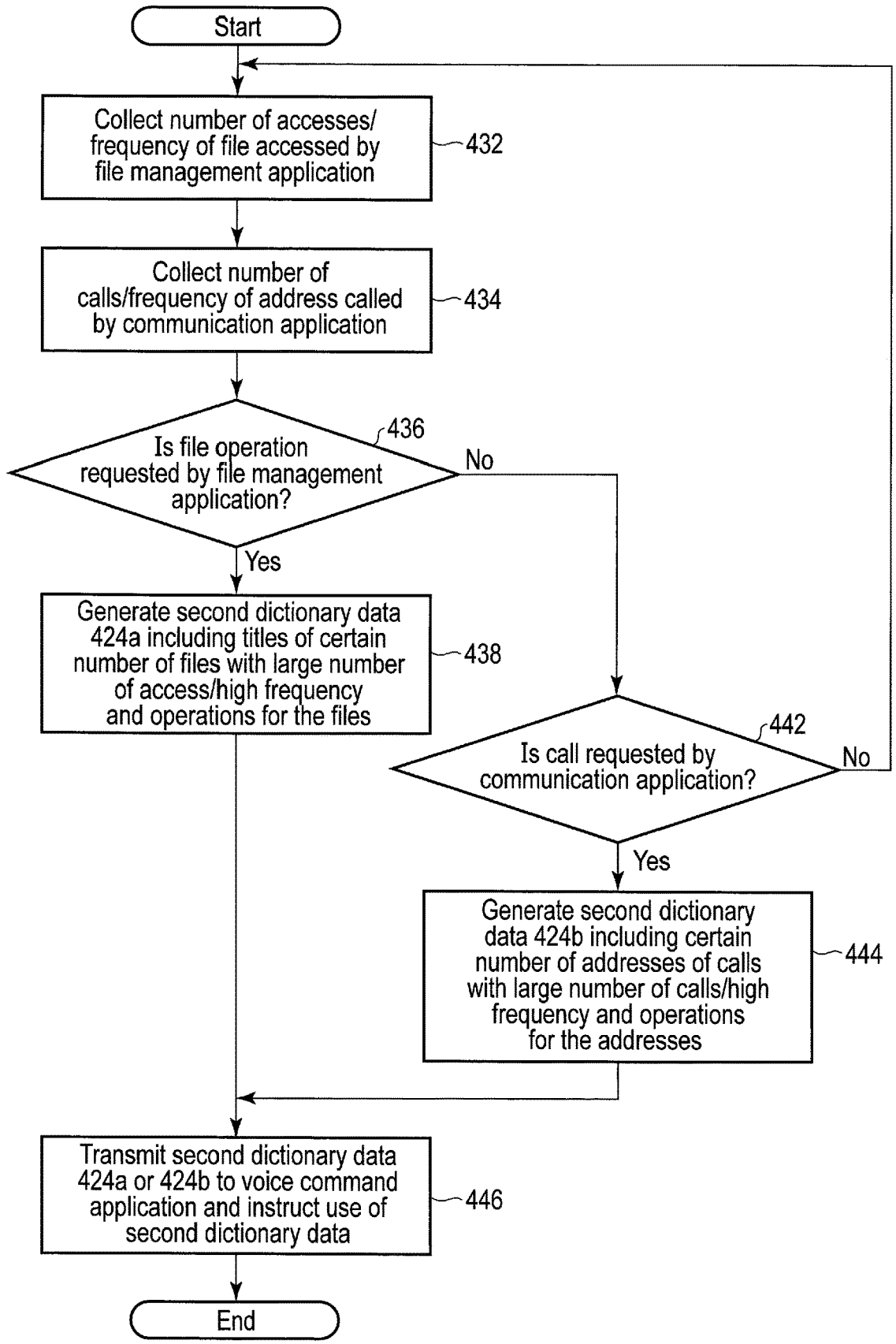
FIG. 12 shows an example of a preparation process of the second dictionary data 424 by the host application 404.

An example of the preparation of the second dictionary data 424 by the host application 404 will be explained with reference to FIG. 12. The second dictionary data 424 is used to correspond to various conditions, and in this example, as shown FIGS. 10 and 11, the second dictionary data 424a used in the file management application and the second dictionary data 424b used in the communication application will be explained.

In block 422, the host application 404 collects the total number accesses/frequency (time interval between consecutive two accesses) of a file accessed by the file management application. In block 434, the host application 404 collects the total number of calls/frequency (time interval between consecutive two calls) of an address called by the communication application. The communication application manages an address book in which addresses are registered and manages the total number of calls/frequency of each address in the address book. The host application 404 performs a process of block 432 in the background while the file management application is activated and performs a process of block 434 in the background while the communication application is activated.

In block 436, the host application 404 determines whether or not a file operation is requested by the file management application. If a file operation is not requested (NO in block 436), the host application 404 determines whether or not a call is requested by the communication application in block 442. If a call is not requested (NO in block 442), the process of block 432 is performed again.

If the determination in block 436 is yes (a file operation is requested), in block 438, the host application 404 selects a certain number of files with a large number of accesses/high frequency, and generates the second dictionary data 424a including titles of the selected files and operations expected to be performed with respect to the files (for example, delete). Then, in block 446, the host application 404 transmits the second dictionary data 424a to the voice command application 318, which is, the voice recognition device 400, and instructs the dictionary memory 414 to store the second dictionary data 424a to be used in the voice recognition.

If the determination in block 442 is yes (a call is requested), in block 444, the host application 404 selects a certain number of addresses of calls with a large number of calls/high frequency from the address book and generates the second dictionary data 424b including the selected addresses of call and operations (call in the selected addresses). Then, in block 446, the host application 404 transmits the second dictionary data 424b to the voice command application 318, which is, the voice recognition device 400, and instructs the dictionary memory 414 to store the second dictionary data 424b to be used in the voice recognition.

[Example of Voice Recognition Process]

Figure 13:
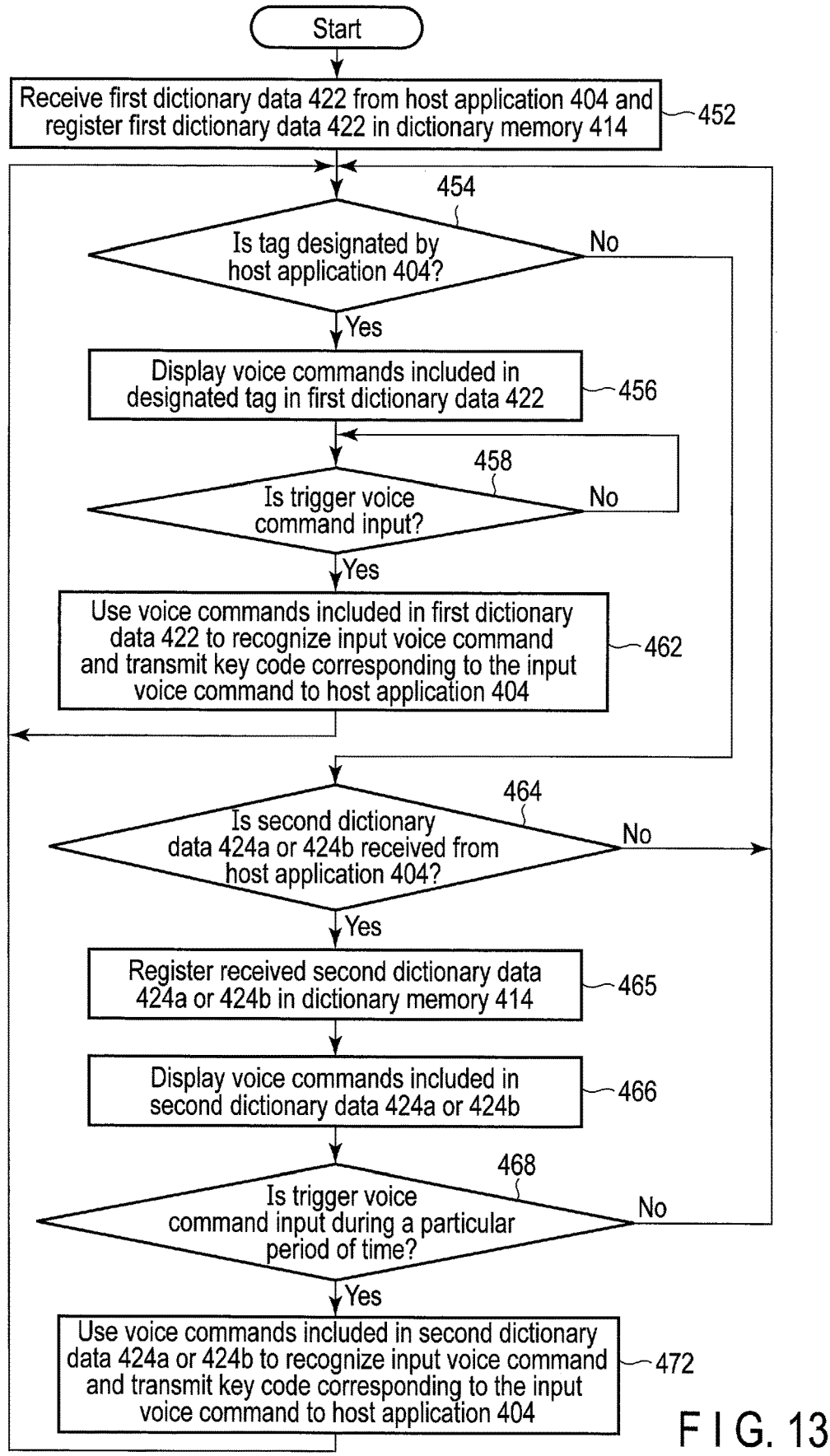
FIG. 13 shows an example of a process of voice recognition device 400 realized by the voice command application 318.

An example of a process of voice recognition device 400 realized by the voice command application 318 will be explained with reference to FIG. 13. The host application 404 initially transmits the first dictionary data 422 to the voice recognition device 404 before the voice recognition device 400 is operated, and then, transmits the second dictionary data 424 to the voice recognition device 404 at a suitable time. In block 452, the voice recognition device 400 receives the first dictionary data 422 from the host application 404 and registers the first dictionary data 422 in the dictionary memory 414. In block 454, the voice recognition device 400 determines whether or not a tag is designated by the host application 404. If a tag is designated, in block 456, die voice recognition device 400 displays the voice commands included in a group of the tag designated in the first dictionary data 422 in the display device 124 of the device main body 24 of the wearable device 23.

FIGS. 14 and 15 show an example of a screen displayed in the display device 124 in block 456. FIG. 14 shows an example where a tag "camera" is designated and FIG. 15 shows an example where a tag "viewer" is designated. If the tag "camera" is designated, a camera view image is displayed, and the voice commands "suchiru", "zumu in", "zumu auto", "bideo on", and "bideo ofu" which are usable are displayed together with the functions of the voice commands. If the tag "viewer" is designated, a still image stored is displayed, and the voice commands "zumu in", "zumu auto", "tsugi", and "mae" which are usable are displayed together with the functions of the voice commands. With the display, a user can check the name and function of the voice commands currently usable.

In order to actually perform the voice recognition, a trigger voice command instructing start of recognition (for example, start or the like) is initially input to start the voice recognition mode, and then, a voice command is input. Although not shown in FIGS. 10 and 11, the first dictionary data 422 includes a trigger tag including trigger voice commands, and the first dictionary data 422 of the trigger tag is selected before the voice recognition mode is started. Thus, the voice recognition device 400 stands by until the trigger voice command is input in block 458. Upon recognition of input of the trigger voice command, the voice recognition mode is started, and in block 462, the voice recognition device 400 selects a group of the tag of the first dictionary data 422 received in block 454, the input voice command is recognized using the voice commands included in the selected group, and the key code corresponding to the recognized voice command is transmitted to the host application 404. Then, the process of block 454 is performed again.

If a tag is not designated in block 454, the voice recognition device 400 determines whether or not the second dictionary data 424a or 424b is received from the host application. 404 in block 464. Upon. detection of use of a particular application by a user, the host application 404 transmits the second dictionary data 424 related to the particular application to the voice recognition device 400. If the second dictionary data 424 is not received, the process of block 454 is performed again. If the second dictionary data 424a or 424b is received, block 465, the voice recognition device 400 registers the second dictionary data 424a or 424b in the dictionary memory 414. If the second dictionary data 424a or 424b is already registered in the dictionary memory 414, the second dictionary data already registered is updated by the second dictionary data received. As a dictionary to be used in the voice recognition, the second dictionary 424 is selected.

In block 466, the voice recognition device 400 displays the voice commands included in the second dictionary data 424a or 424b in the display device 124 of the device main body 24 of the wearable device 23. FIGS. 16 and 17 show an example of a screen displayed in the display device 124 in block 466. FIG. 16 shows the voice commands included the second dictionary data 424a generated by the host application 404 when a user starts using the file management application. From the screen of FIG. 16, at this point of time, it is recognized that four voice commands "sakura ichi", "sakura ni", "sakura san", and "ume" are usable as titles (file names "sakura1", "sakura2", "sakura3", and "ume") with respect to the file management application, and the voice command "derito" is usable as an operation. FIG. 17 shows the voice commands included in the second dictionary data 424b generated by the host application 404 when a user starts using the communication application. From the screen of FIG. 17, at this point of time, it is recognized that four voice commands of "sato", "suzuki", "tanaka", and "watanabe" are usable as addresses, and the voice command "Tuwa" is usable as an operation. From the above displays, a user can recognize the name and function of the voice commands currently usable.

The voice recognition device 400 selects the first dictionary data 422 of the trigger tag as a dictionary to be used for the voice recognition in block 468 and waits for a particular period of time until the trigger voice command is input. If the trigger voice command is not input after the particular period of time, the process of block 434 is performed again. If an input of the trigger voice command is detected within the particular period of time, in block 472, the voice recognition device 400 selects the second dictionary data 424a or 424b as the dictionary used for the voice recognition, recognizes the input voice command using the voice commands included in the second dictionary data 424a or 424b, and transmits the key code corresponding to the input voice command to the host application 404. Then, the process of block 454 is performed again.

Note that a timeout may be set during the recognition process of block 462 or 472. That is, if a result of recognition is not obtained in a particular period of time after start of recognition, the process may be stopped and a failure of recognition may be notified. As can be understood from the above, in the present embodiment, the dictionary memory 414 stores the first dictionary data 422 divided into a plurality of sub dictionaries and the second dictionary data 424 which dynamically redefines a relationship between a small number of voice commands and key codes. The first dictionary data 422 is a dictionary which preliminarily defines a relationship between a large number of voice commands and key codes. Since input voice commands are recognized using any of a plurality of sub dictionaries of the first dictionary or the second dictionary, the data size of the dictionaries can be suppressed. Thus, in a short time, voice recognition with a less misrecognition rate can be performed. By using the second dictionary dynamically changed, a user using the host application 404 does not need to prepare dictionary data of a large size, and can realize the voice command operation flexibly corresponding to the condition of the host application 404. Furthermore, the first dictionary is divided into a plurality of sub dictionaries, and thus, when the first dictionary is used, one of the sub dictionaries is selected. Thus, the voice command conforming to the function and condition of the host application 404 can be used, and the user can utilize the voice operation more effectively.

[Variations]

FIG. 18 shows a variation 422b of the first dictionary. As shown in blocks 458 and 468 of FIG. 13, the voice recognition is started when a trigger voice command is input. The voice recognition may be end automatically after a particular period of time or may be continued until a voice command to end the recognition is input. The former function is referred to as a single mode and the latter function is referred to as a multiple mode. The first dictionary data 422b of FIG. 18 includes a tab for the single mode and a tab for the multiple mode related to the camera application. Note that, in this example, the single mode is set as the recognition mode in the initial state, and the recognition mode is changed to the multiple mode when the trigger voice command of the multiple mode is input. When a voice command to end the multiple mode is input during the operation of the multiple mode, the recognition mode returns to the single mode or the voice recognition ends.

The group with the tag name "single" of the first dictionary data 422b includes, for example, voice commands "hai", "maruchi", "suchiru", "zumu in", "zumu auto", and the like. The key code corresponding to the voice command "hai" is a key code of F1 key (instructing starting voice recognition in the single mode), the key code corresponding to the voice command "maruchi" is a key code of F2 key (instructing starting voice recognition in the multiple mode), the key code corresponding to the voice command "suchiru" is a key code of Enter key (instructing taking a still image), the key code corresponding to the voice command "zumu in" is a key code of Up key (instructing increasing a magnification), and the key code corresponding to the voice command "zumu auto" is a key code of Down key (instructing decreasing a magnification).

The group with the tag name "multiple" of the first dictionary data 422b includes, for example, voice commands "owari", "suchiru", "zumu in", and "zumu auto". The key code corresponding to the voice command "owari" is a key code of F10 key (instructing ending voice recognition in the multiple mode), the key code corresponding to the voice command "suchiru" is a key code of Enter key (instructing taking a still image), the key code corresponding to the voice command "zumu in" is a key code of Up key (instructing increasing a magnification), and the key code corresponding to the voice command "zumu auto" is a key code of Down key (instructing decreasing a magnification).

When the first dictionary data 422b as above is used, the voice recognition shown in FIGS. 19A and 19B is performed. As shown in FIG. 19A, when a voice command "hai" to start the single mode is input, and the voice command "hai" is recognized, the recognition period in the single mode is started. Then, a user inputs a command to operate the camera with voice. For example, the voice command "zumu in" is recognized, the magnification of camera is increased. If a particular period of time t1 passes after the recognition of the voice command "hai", the recognition period ends. Then, if the camera is further operated by a voice command, the user again inputs the voice command "hai" to start the single mode.

As shown in FIG. 19B, if the voice command "hai" to start the single mode is input, and the voice command "hai" is recognized, and then a voice command "maruohi" to start the multiple mode is input, and the voice command "maruchi" is recognized, the recognition mode is switched from the single mode to the multiple mode. In the multiple mode, a plurality of voice commands are, input and recognized continuously. In the multiple mode, if the voice command "owari" to end the multiple mode is input, and the voice command "owari" is recognized, the recognition mode returns to the single mode or the voice recognition ends.

Note that, the initial mode is the single mode in the above example. However, the initial mode may be the multiple mode. Furthermore, the initial mode may not be set and the initial state may be set to wait for mode designation to receive a voice command to designate the single mode or the multiple mode. Operating the host application 404 using the voice recognition is to find a voice command most similar to the result of recognition of the input voice command from a dictionary and to generate a key code corresponding to the most similar voice command. A voice can be interpreted differently depending on the gender, age, birth place, character, or the like of user, and thus, different results of voice recognition may be derived from similar voices. In order to deal with this, the same key code is assigned to slightly different voice commands to realize a versatile dictionary.

FIG. 20 shows another variation 422c of the first dictionary. For example, the first dictionary data 422c is prepared such that the key code to start the voice recognition in the single mode (F1 key) corresponds to voice commands "hai", "haixtsu", and "haii", the key code to take a still image (Enter key) corresponds to voice commands "suchiru" and "suchiiru", and the key code to increase the magnification of camera (Up key) corresponds to voice commands "zumu in", "zumu iin", and "zuumu in".

FIG. 21 shows another variation 424c of the second dictionary. For example, the second dictionary data 424c is prepared such that the key code to select address "sato" ("s", "a", "t", and "o" keys) correspond to voice commands "sato", "satoo", and "satou". In the above description, a short cut key of combinations of a plurality of key codes is assigned to the voice command. However, a combination of a plurality of the same key code may be assigned to the voice command and a continuous operation of a single key (for example, hold) may be realized by the voice command. For example, when a cursor is moved by the voice command to select an icon in the menu, as shown in FIG. 22, the first dictionary or the second dictionary may be structured such that a key code of Up key is generated once in response to a voice command "appu" or "ue", and the key code of Up key is generated repeatedly for several times in response to a voice command "appuu" or "uee" while the voice command is input. Similarly, a key code of Down key is generated once in response to a voice command "daun" or "shita", and the key code of Down key is generated repeatedly for several times in response to a voice command "daunn" or "shitaa" while the voice command is input. A key code of Right key is generated once in response to a voice command "raito" or "migi", and the key code of Right key is generated repeatedly for several times in response to a voice command "raitoo" or "migii" while the voice command is input. A key code of Left key is generated once in response to a voice command "refuto" or "hidari", and the key code of. Left key is generated repeatedly for several times in response to a voice command "refutoo" or "hidarii" while the voice command is input.

Note that, the movement of cursor may be performed through the operation of the touch pad 110 of FIGS. 3 and 6, and the five buttons 202 of FIGS. 7 and 8. As described above, the vertical and horizontal orientations of the touch pad 110 of FIGS. 3 and 6, and the five buttons 202 of FIGS. 7 and 8 may differ depending on the temple (right or left) on which the device main body 24 is attached. The device main body 24 can detect on which temple it is attached by the motion sensor 176, and transmits a result of detection to the mobile PC 16. The voice command application 318 can change the definition of the vertical and horizontal orientations of the first dictionary data 422 or the second dictionary data 424 on the basis of the result of detection. Note that, the voice command application 318 may output command data other than the key code, and the remote support application may recognize the command data.

The processing of this embodiment can be realized by means of a computer program, and hence it is possible to easily realize an advantage identical to this embodiment by only installing this computer program into a computer via a computer-readable storage medium storing therein this computer program, and executing this computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and chances in the form of the embodiments described herein may be made without departing from the spirit of the inventions. The accompanying claims and their equivalents are intended to cover such forms or modifications as would fail within the scope and spirit of the inventions.

What is claimed is:

1. An electronic device comprising:
a memory that stores dictionary data indicative of a relationship between a voice command and command data corresponding to the voice command;
a voice input receiver that receives a voice; and
a hardware processor that recognizes the received voice and determines the command data corresponding to the recognized voice command of the received voice using the dictionary data, wherein
the dictionary data comprises first dictionary data and second dictionary data,
the second dictionary data comprises updatable data,
a number of voice commands in the first dictionary data. is greater than a number of voice commands in the second dictionary data,
the first dictionary data is divided into a plurality of sub-dictionaries, and
the hardware processor recognizes the received voice using at least one of the plurality of sub-dictionaries or the second dictionary data.

2. The electronic device of claim 1, wherein
the memory stores the first dictionary data and the second dictionary data respectively transmitted from an external device.

3. The electronic device of claim 2, wherein,
when a new second dictionary data is transmitted from the external device, the memory writes the new second dictionary data over the second dictionary data previously stored in the memory.

4. The electronic device of claim 1, wherein
the hardware processor selects the at least one of the sub-dictionaries or the second dictionary data, based at least in part on designating data transmitted from an external device.

5. The electronic device of claim 1, wherein
the number of voice commands in the second dictionary data is less than a first number, and
a number of voice commands in each of the sub-dictionaries is less than the first number.

6. The electronic device of claim 1, wherein
the dictionary data indicates a relationship between the voice command and at least one command data corresponding to the voice command.

7. The electronic device of claim 1, wherein
the hardware processor
operates in a first operation mode or a second operation mode,
recognizes the received voice for a particular period of time after a start of recognition is instructed in the first operation mode, and
recognizes the received voice after the start of recognition is instructed in the second operation mode and until an end of recognition is instructed in the second operation mode.

8. The electronic device of claim 7, wherein
the dictionary data indicates
a relationship between a first voice command in the first operation mode to execute the recognition for the particular period of time and first command data corresponding to the first voice command,
a relationship between a second voice command in the second operation mode to start the recognition and second command data corresponding to the second voice command, and
a relationship between a third voice command in the second operation mode to end the recognition and third command data corresponding to the third voice command.

9. The electronic device of claim 1, wherein
the hardware processor notifies, before recognizing the received voice, voice commands included in the at least one of the sub-dictionaries or the second dictionary data to a user.

10. The electronic device of claim 9, further comprising:
a display that displays the voice commands included in the at least one of the sub-dictionaries or the second dictionary data, and functions of the voice commands.

11. The electronic device of claim 1, wherein
the dictionary data indicates a relationship between the voice command and a key code corresponding to the voice command.

12. The electronic device of claim 11, wherein
the dictionary data indicates a relationship between a plurality of voice commands and one same key code corresponding to the plurality of voice commands.

13. A recognition method using first dictionary data indicative of a relationship between a voice command and command data corresponding to the voice command, and second dictionary data indicative of a relationship between a voice command and command data corresponding to the voice command,
wherein the first dictionary data is divided into a plurality of sub-dictionaries, the second dictionary data comprises updatable data, and a number of voice commands in the first dictionary data is greater than a number of voice commands in the second dictionary data,
the method comprising:
recognizing a received voice using at least one of the plurality of sub-dictionaries or the second dictionary data.

14. A non-transitory computer-readable storage medium having a computer program stored thereon for a computer storing first dictionary data indicative of a relationship between a voice command and command data corresponding to the voice command and second dictionary data indicative of a relationship between a voice command and command data corresponding to the voice command,
wherein the first dictionary data is divided into a plurality of sub-dictionaries, the second dictionary data comprises updatable data, and a number of voice commands in the first dictionary data as greater than a number of voice commands in the second dictionary data,
the computer program controlling the computer to execute functions of:
recognizing a received voice using at least one of the plurality of sub-dictionaries or the second dictionary data.

* * * * *